(12) United States Patent
Ishitsuka

(10) Patent No.: US 9,731,671 B2
(45) Date of Patent: Aug. 15, 2017

(54) ENERGY ABSORBER AND BUMPER STRUCTURAL BODY

(71) Applicant: HONDA MOTOR CO., LTD., Minato-Ku, Tokyo (JP)

(72) Inventor: Yuji Ishitsuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/064,414

(22) Filed: Mar. 8, 2016

(65) Prior Publication Data

US 2016/0264083 A1 Sep. 15, 2016

(30) Foreign Application Priority Data

Mar. 10, 2015 (JP) ................. 2015-046656
Mar. 10, 2015 (JP) ................. 2015-046658
Oct. 13, 2015 (JP) ................. 2015-201972

(51) Int. Cl.
*B60R 19/34* (2006.01)
*B60R 19/03* (2006.01)

(52) U.S. Cl.
CPC ............. *B60R 19/34* (2013.01); *B60R 19/03* (2013.01)

(58) Field of Classification Search
CPC .................. B60R 19/34; B60R 19/03
See application file for complete search history.

(56) References Cited

FOREIGN PATENT DOCUMENTS

| JP | S58-179626 A | 10/1983 |
|---|---|---|
| JP | S59-061923 U | 4/1984 |
| JP | 08-177922 A | 7/1996 |
| JP | 2002-307475 A | 10/2002 |
| JP | 2005-308133 A | 11/2005 |
| JP | 2007015626 A | 1/2007 |

OTHER PUBLICATIONS

Office Action dated May 2, 2017 issued over the corresponding Japanese Patent Application 2015-201972 with the English translation thereof.

*Primary Examiner* — Lori L Lyjak
(74) *Attorney, Agent, or Firm* — Carrier Blackman & Associates, P.C.; Joseph P. Carrier; Anne G. Sabourin

(57) ABSTRACT

An energy absorber includes a main body of a closed cross-sectional structure formed by injection-molding a fiber-reinforced thermoplastic and having a weld line formed thereon. The main body has openings defined in opposite ends thereof, each of the openings being of a polygonal shape. The weld line is formed on a side surface of the main body. A tilt angle of the weld line is set to a value in a range from −35° to 35° with respect to a reference line interconnecting midpoints on opposite sides of the side surface that are located at the opposite ends of the main body.

10 Claims, 21 Drawing Sheets

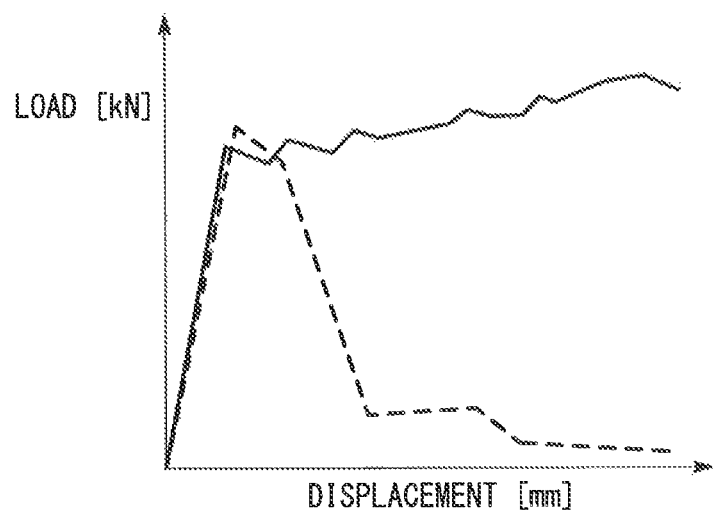

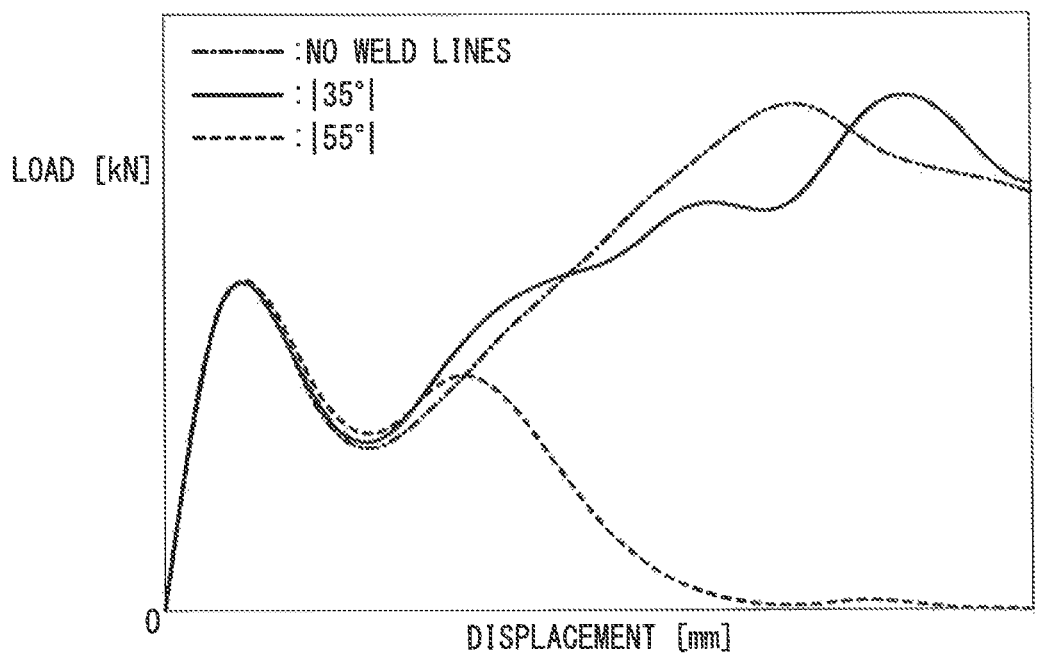

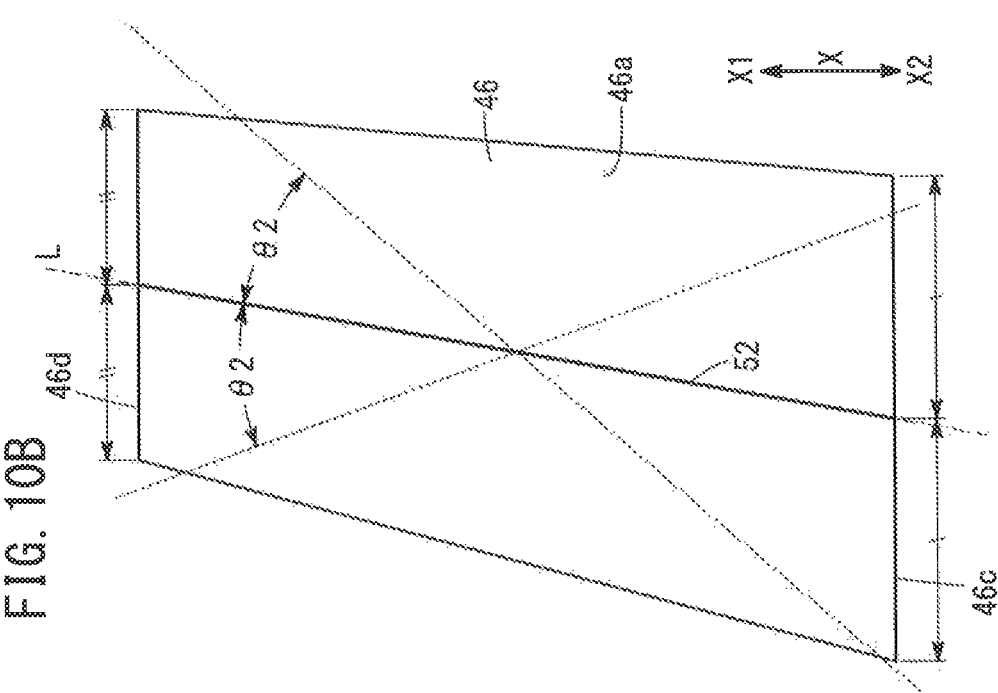
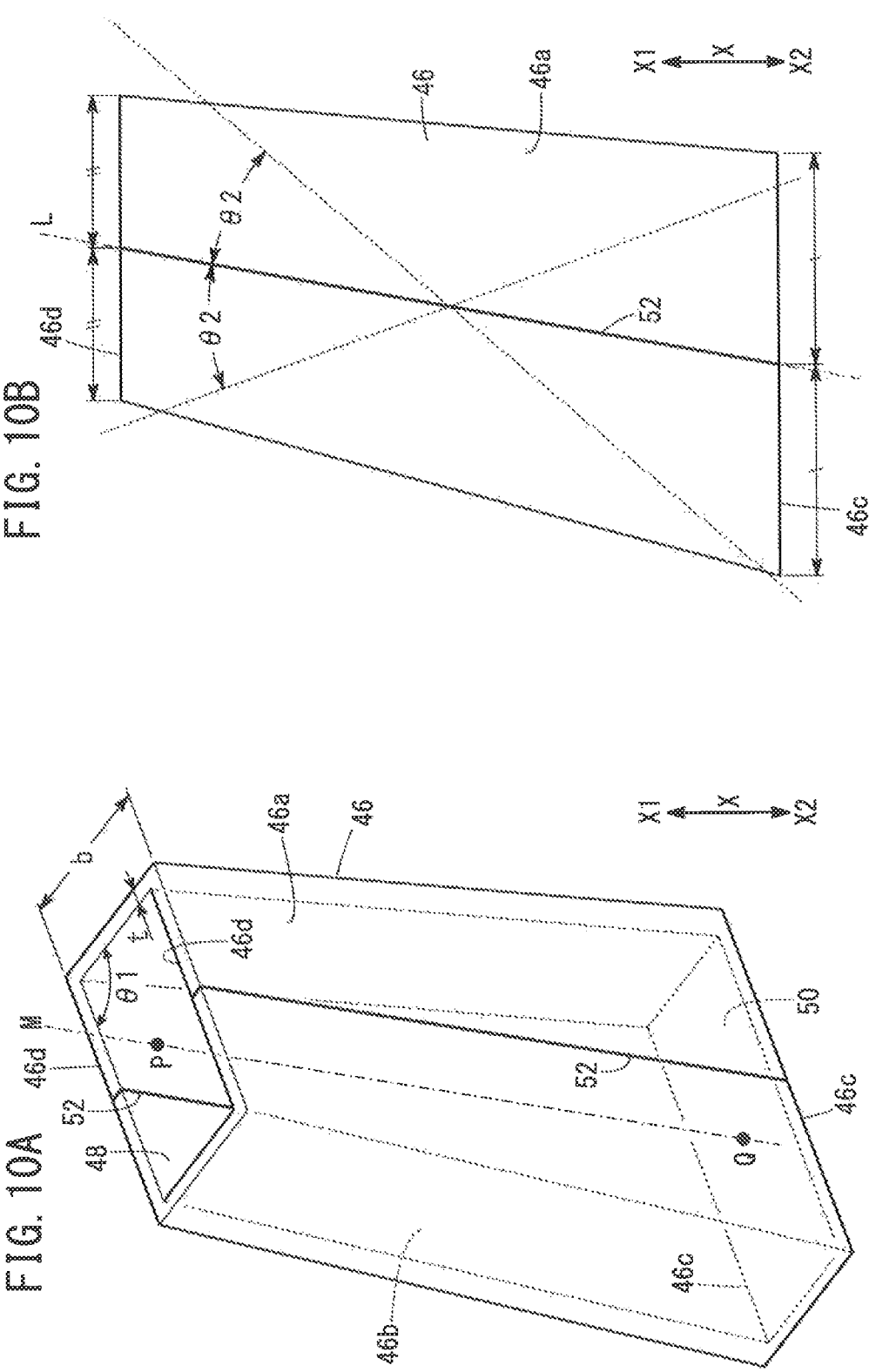

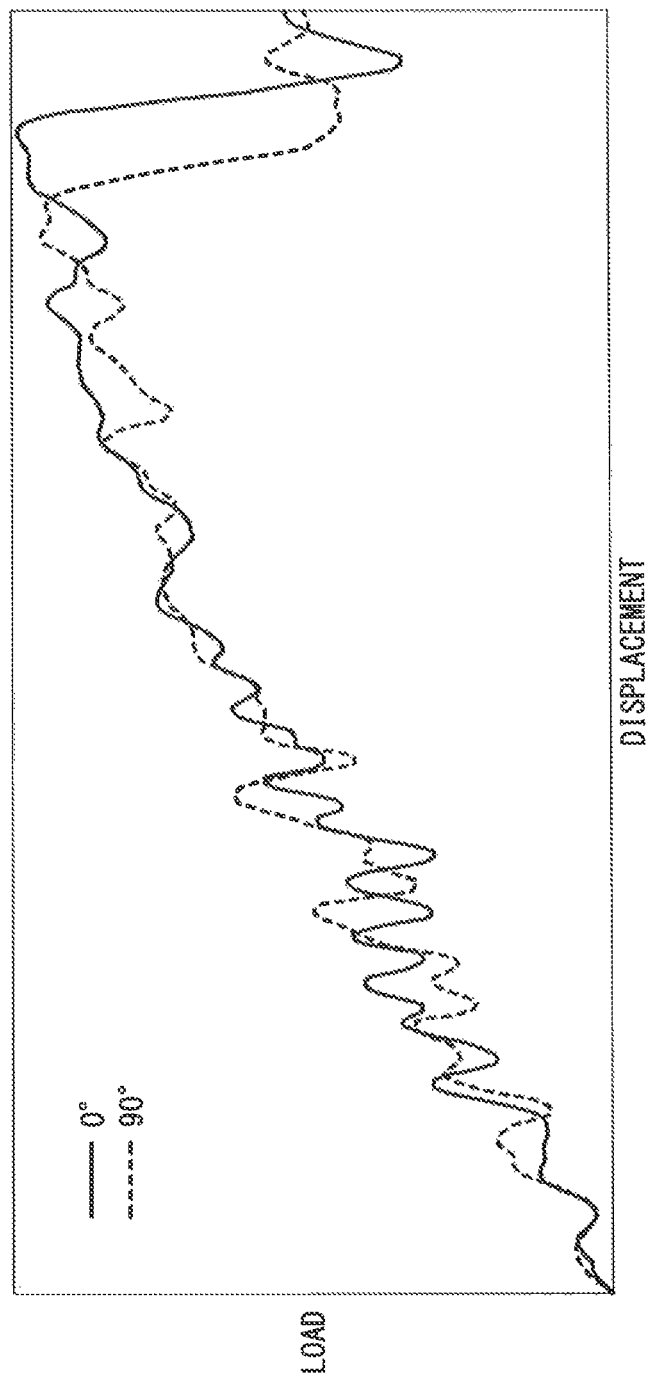

ENERGY ABSORBER AND BUMPER STRUCTURAL BODY

CROSS-REFERENCE TO RELATED APPLICATIONS

This application is based upon and claims the benefit of priority from Japanese Patent Applications No. 2015-046656 filed on Mar. 10, 2015, No. 2015-046658 filed on Mar. 10, 2015 and No. 2015-201972 filed on Oct. 13, 2015, the contents all of which are incorporated herein by reference.

BACKGROUND OF THE INVENTION

Field of the Invention

The present invention relates to an energy absorber that is produced by injection-molding a fiber-reinforced thermoplastic, and a bumper structural body wherein such energy absorbers are mounted on a bumper beam.

Description of the Related Art

Generally, a bumper beam attached to each of the front and rear portions of an automobile body or the like is combined with energy absorbers mounted thereon, making up a bumper structural body. When an impact load is applied to the energy absorbers, they are compressively fractured, thereby absorbing the applied energy.

As disclosed in Japanese Laid-Open Patent Publication No. 08-177922, for example, it is known in the art that a fiber-reinforced thermoplastic (FRTP) which is lighter in weight and easier to mold than metals or the like is used as the material of an energy absorber.

The bumper structural body is mounted on a vehicle body such that the bumper beam extends along the transverse directions of the vehicle body and the energy absorbers have their main portions extending along the longitudinal directions of the vehicle body.

Specifically, the main portions of the energy absorbers have respective ends attached to the bumper beam and respective other ends attached to a frame or the like of the vehicle body. The bumper beam is thus positioned on and fixed to the vehicle body such that ends of the bumper beam in the extending direction are supported by the energy absorbers.

A load is primarily applied to the bumper structural body along a longitudinal direction of the vehicle body. In this case, the bumper beam is deformed thereby to absorb the energy. When the bumper beam is deformed, a tensile load is applied to the energy absorbers supporting the bumper beam, along the extending direction of the bumper beam. If a load in excess of the energy that can be absorbed by the deformation of the bumper beam is applied to the bumper structural body, then the load is transmitted from the bumper beam to the energy absorbers, which absorb the energy by being compressively fractured.

Japanese Laid-Open Patent Publication No. 2007-015626, for example, discloses a bumper structural body wherein energy absorbers made of FRTP are mounted on a bumper beam.

SUMMARY OF THE INVENTION

For producing an energy absorber from FRTP, it is preferable to employ an injection molding process in order to achieve an increase in the production efficiency and a reduction in the cost. While the energy absorber is being molded in a mold assembly according to the injection molding process, a weld line, which is lower in mechanical strength than the other regions, is formed in a region where flows of molten resin join each other and are fused together in the mold assembly.

As described above, when an impact load is applied to an energy absorber, the energy absorber is compressively fractured, whereby the energy absorber is capable of efficiently absorbing the energy. However, depending on the layout of the weld line with respect to the direction in which the impact load is applied, prior to the occurrence of the compressive fracture, the energy absorber may crack or may be damaged at the weld line, which is lower in mechanical strength than the other regions. In other words, those energy absorbers that do not take the layout of weld lines into consideration at all may possibly find it difficult to efficiently absorb the applied energy, disadvantageously.

Furthermore, once an energy absorber has cracked or has been damaged due to an excessive load applied to the weld line, the energy absorber fails to support the bumper beam, and makes it difficult for the bumper beam to be sufficiently deformed to thereby absorb the energy. As a result, it may possibly be difficult for the bumper structural body to efficiently absorb the applied energy.

It is a principal object of the present invention to provide an energy absorber in which a weld line is positioned depending on the direction along which a load is applied and the relationship to the efficiency of an injection molding process by which the energy absorber is molded, whereby the energy absorber can be produced with an increased production efficiency and is capable of efficiently absorbing the applied energy.

Another object of the present invention is to provide a bumper structural body which is capable of efficiently absorbing the applied energy by preventing the energy absorber from cracking or being damaged at a weld line thereon.

According to an embodiment of the present invention, there is provided an energy absorber including a main body of a closed cross-sectional structure formed by injection-molding a fiber-reinforced thermoplastic, the energy absorber having a weld line formed thereon, wherein the main body has openings defined in opposite ends thereof, each of the openings being of a polygonal shape, and the weld line is formed on a side surface of the main body, and a tilt angle of the weld line is set to a value in a range from −35° to 35° with respect to a reference line interconnecting midpoints on opposite sides of the side surfaces that are located at the opposite ends of the main body.

Generally, when a load is applied to an energy absorber, a plane where a principal shear stress acts (principal shear stress plane) is inclined at an angle of ±45° with respect to the direction in which the load is applied. If the main body of the energy absorber according to the present invention is of a substantially symmetrical shape whose symmetric axis is represented by a central axis interconnecting the inner centers of the openings in the opposite ends of the main body, then the energy absorber is mounted on a vehicle body or the like so that a load will be applied in a direction along the reference line. Therefore, in order to prevent the weld lines from being disposed on the principal shear stress plane, the tilt angle of the weld lines with respect to the reference line is set so as not to be ±45°.

Specifically, an error occurs between the setting value and the measured value of the tilt angle within a range of ±10° due to manufacturing variations of the energy absorber. In view of the error, the setting value of the tilt angle may be set to −55° or smaller, within a range from −35° to 35°, or to 55° or greater, thereby effectively preventing the measured value of the tilt angle from becoming ±45°.

The direction along which a load is applied to the energy absorber may be inclined at an angle of about ±30° relative to the direction along the reference line, for example. When a bending force due to an oblique load is applied to the energy absorber, if the tilt angle is −55° or smaller, or 55° or greater, i.e., if the absolute value of the tilt angle is |55°| or greater, the efficiency with which to absorb energy may possibly be lowered. This is because, as described below, as the absolute value of the tilt angle approaches |90°| (maximum value), the bending force applied to the weld lines tends to increase, so that the energy absorber breaks easily at the weld lines.

Specifically, the main body of the energy absorber generally has a long side extending along the reference line and a short side extending perpendicularly to the reference line. Thus, as the absolute value of the tilt angle increases, the direction of the weld lines approaches a direction parallel to the short side of the main body. As a result, the length of the weld lines is reduced, and the cross-sectional area of the main body along the weld lines also decreases. Consequently, as the absolute value of the tilt angle increases, a tensile load applied to the weld lines by the bending force increases, resulting in an increase in the stress applied to the weld lines which is determined by dividing the tensile load by the cross-sectional area of the main body along the weld lines. If the absolute value of the tilt angle is |55°| or greater, therefore, the energy absorber is considered to be easily broken at the weld lines.

Thus, in the energy absorber according to the present invention, the tilt angle is set to fall within the range of −35° to 35°, i.e., the absolute value of the tilt angle is equal to or smaller than |35°|, excluding the range in which the absolute value of the tilt angle is equal to or greater than |55°|. Inasmuch as this prevents the tilt angle from becoming ±45° even in view of manufacturing variations, the weld lines are effectively prevented from being disposed in the principal shear stress plane. Moreover, since the absolute value of the tilt angle is prevented from approaching |90°|, an excessive bending force is prevented from being imposed on the weld lines even when an oblique load is applied.

If the main body is asymmetrical with respect to the central axis thereof, the direction along which a load is applied to the energy absorber may be inclined from the direction along the reference line. Even if this happens, by setting the tilt angle in the above range, the weld lines can be prevented from being disposed in the principal shear stress plane or a region where an excessive bending force is applied.

When the above asymmetrically shaped main body is to be injection-molded with the weld lines being formed in the above layout, adjustment of the tilt angle with respect to the reference line can relatively easily be performed. Specifically, molten resin is supplied to a mold cavity along the reference line, whereby the tilt angle of the weld line with respect to the reference line can be easily set to fall within the above range. Consequently, the efficiency with which to produce the energy absorber is prevented from being lowered even when the energy absorber is injection-molded with the tilt angle of the weld lines being set in the above range.

From the foregoing, the energy absorber according to the present invention can efficiently be produced by injection molding and can efficiently absorb the applied energy while being prevented from cracking or being damaged at the weld lines.

In the above energy absorber, the main body should preferably include at least a portion having a horizontal cross section, the horizontal cross section having a first side and a second side adjacent to the first side, the first side should preferably have a thickness t and a length b, the thickness t and the length b having a relationship of t/b≥0.045, and the first side and the second side should preferably form therebetween an angle equal to or smaller than 150°. In this case, it is possible to increase the buckling strength of the energy absorber at the time the load is applied to the energy absorber in the direction along the reference line, and the energy absorber is prevented from being deformed in an out-of-plane direction of a cross section perpendicular to the reference line. In other words, when the energy absorber absorbs the applied energy, it is compressively fractured while being broken into pieces. This makes it possible for the energy absorber to absorb the energy even more efficiently.

According to another embodiment of the present invention, there is also provided an energy absorber including a main body of a closed cross-sectional structure formed by injection-molding a fiber-reinforced thermoplastic, the energy absorber having a weld line formed thereon, wherein the main body has openings defined in opposite ends thereof, each of the openings being of a circular shape, and a tilt angle of the weld line is set to a value in a range from −35° to 35° with respect to a reference line extending along an axial direction of the main body.

The above energy absorber also offers the same advantages as described above. Specifically, the energy absorber can efficiently be produced by injection molding and can efficiently absorb the applied energy while being prevented from cracking or being damaged at the weld lines.

In the above energy absorber, the tilt angle should preferably be 0°. The tilt angle thus set is able to effectively prevent the energy absorber from cracking or being damaged at the weld lines, thereby making the efficiency with which to absorb the applied energy much higher.

In the above energy absorber, either one of the opposite ends of the main body should preferably be attached to a bumper beam. The energy absorber thus installed is capable of effectively absorbing the energy of an impact load that is applied to the front or rear portion of an automobile body or the like.

According to still another embodiment of the present invention, there is further provided a bumper structural body including a bumper beam extending along a transverse direction of a vehicle body and an energy absorber having a main body of a closed cross-sectional structure formed by injection-molding a fiber-reinforced thermoplastic, the energy absorber having a weld line formed thereon, the energy absorber being mounted on the bumper beam, the main body extending along a longitudinal direction of the vehicle body, wherein the weld line has an end and another end disposed respectively on a front end and a rear end of the energy absorber in the longitudinal directions, and a tilt angle of a layout line with respect to a first imaginary line is equal to or less than 30°, wherein the first imaginary line is defined as an imaginary line that passes through a first midpoint which is a midpoint between upper and lower ends, in a vertical direction of the vehicle body, of an opening defined in a front end of the main body which faces the bumper beam, and extends along a direction in which the bumper beam extends, the layout line is defined as an imaginary line that passes through an intersection between the first imaginary line and a second imaginary line, and through the end of the weld line, and the second imaginary line is defined as an imaginary line that passes through a second midpoint which is a midpoint between an end and another end of the opening in the direction in which the bumper beam extends, and extends along the vertical direction of the vehicle body.

When a load is applied to the bumper structural body, the bumper beam is deformed, and then a tensile load is applied to the energy absorber which supports the bumper beam. The tensile load acts on the front end of the energy absorber attached to the bumper beam along the directions in which the bumper beam extends. Since the rear end of the energy absorber is fixed to the frame or the like of the vehicle body, a bending stress acts on the main body such that the main body bulges outwardly in the vehicle transverse direction.

The amount of energy absorbed by the bumper structural body can be expressed as an area between a displacement-load curve and a displacement axis in a displacement-load (reaction force) diagram of the bumper structural body. The displacement-load diagram can be determined from the displacement of an impactor at the time the impactor applies a load to the bumper structural body, and a reaction force generated between the impactor and the bumper structural body. Therefore, the amount of energy absorbed by the bumper structural body can be determined on the basis of the magnitudes of the displacement amount and the reaction force.

In the bumper structural body according to the present invention, the above tilt angle is set to be 30° or less. Specifically, the weld lines are disposed depending on the directions in which the bumper beam extends, i.e., the directions along which the tensile load is applied. As the tilt angle θ approaches 0°, it is more effective in preventing reduction of the second moment of area of the energy absorber with respect to the above bending stress. Therefore, it is possible to make the rigidity of the energy absorber closer to the rigidity of an energy absorber which is free of weld lines.

Similarly, the closer the tilt angle is to 0°, the greater the above reaction force becomes, and the closer the tilt angle is to 30°, the greater the above displacement amount becomes. Therefore, as described above, if the tilt angle is equal to or less than 30°, the absorbed amount of energy determined on the basis of the magnitudes of the displacement amount and the reaction force is sufficiently large.

From the foregoing, the bumper structural body according to the present invention can be produced in lighter weight and with increased productivity since the energy absorber can be formed by injection-molding of a fiber-reinforced thermoplastic. Since an excessive load is prevented from being applied to the weld lines even when the energy absorber is injection-molded, the energy absorber is prevented from cracking or being damaged at the weld lines. Consequently, the energy absorber can efficiently absorb the applied energy while sufficiently supporting the bumper beam which is being deformed under load.

In the above bumper structural body, the layout line should preferably extend along the direction in which the bumper beam extends. In this case, since the tilt angle can be set to 0°, the bumper structural body with the weld lines formed in the energy absorber exhibits the same rigidity as a bumper structural body with no weld lines formed in its energy absorber. Furthermore, the above reaction force can be maximized. The bumper structural body can thus efficiently absorb the applied energy while more effectively supporting, by the energy absorber, the bumper beam that is being deformed under load.

In the above bumper structural body, the weld line should preferably extend along the longitudinal directions of the vehicle body. A load is applied to the bumper structural body along the directions in which the weld lines extend. Therefore, when the load is applied to the energy absorber, the weld lines, which are lower in mechanical strength than the other regions, are prevented from being disposed on a plane where a principal shear stress acts (principal shear stress plane). Even when a load is applied to the bumper structural body from a direction inclined with respect to the longitudinal directions of the vehicle body, an excessive bending force is prevented from being applied to the weld lines. As a result, the bumper structural body is capable of efficiently absorbing the applied energy while preventing the energy absorbers from cracking or being damaged at the weld lines.

The above and other objects, features, and advantages of the present invention will become more apparent from the following description when taken in conjunction with the accompanying drawings in which preferred embodiments of the present invention are shown by way of example.

BRIEF DESCRIPTION OF THE DRAWINGS

FIG. 8 is a displacement-load diagram of the energy absorber shown in FIG. 1;

FIG. 9 is a displacement-load diagram obtained by a simulation of an energy absorber to which an oblique load is applied;

FIG. 10A is a schematic perspective view of the main body of an energy absorber according to a second embodiment of the present invention;

FIG. 10B is a schematic front elevational view of the main body shown in FIG. 10A;

FIG. 21 is a displacement-load diagram obtained by conducting a fracture test on the bumper structural bodies according to the embodiment of the present invention and the comparative example.

DESCRIPTION OF THE PREFERRED EMBODIMENTS

Energy Absorbers

Energy absorbers according to preferred embodiments of the present invention will first be described in detail below with reference to FIGS. 1 through 11A, 11B of the accompanying drawings.

Each of the energy absorbers according to the preferred embodiments of the present invention, upon being subjected to a load such as an impact force or the like applied thereto, serves to absorb the energy of the load by being compressively fractured. The energy absorber is produced by injection-molding a fiber-reinforced thermoplastic. The matrix resin of the fiber-reinforced thermoplastic is not limited to any materials, but may be selected, depending on applications, from a variety of thermoplastics including polyamide resin, polyvinyl chloride resin, polypropylene resin, styrol resin, ABS resin, fluorine resin, polycarbonate resin, acetal resin, etc.

The reinforcing fibers should preferably include inorganic fibers such as glass fibers, carbon fibers, or the like, or organic fibers such as aramid fibers, cellulose fibers, or the like. The length of the reinforcing fibers may be in the range from 1.0 to 2.0 mm, for example, though it is not limited to that range, and may be set to any value insofar as it allows the fiber-reinforced thermoplastic to be injection-molded.

The energy absorber may be mounted on a bumper beam, for example, so that it can appropriately absorb the energy of a load which is applied to each of the front and rear portions of an automobile body or the like on which the bumper beam is installed. An energy absorber to be mounted on the front bumper beam on an automobile body will be described below by way of example.

First Embodiment

Figure 1:
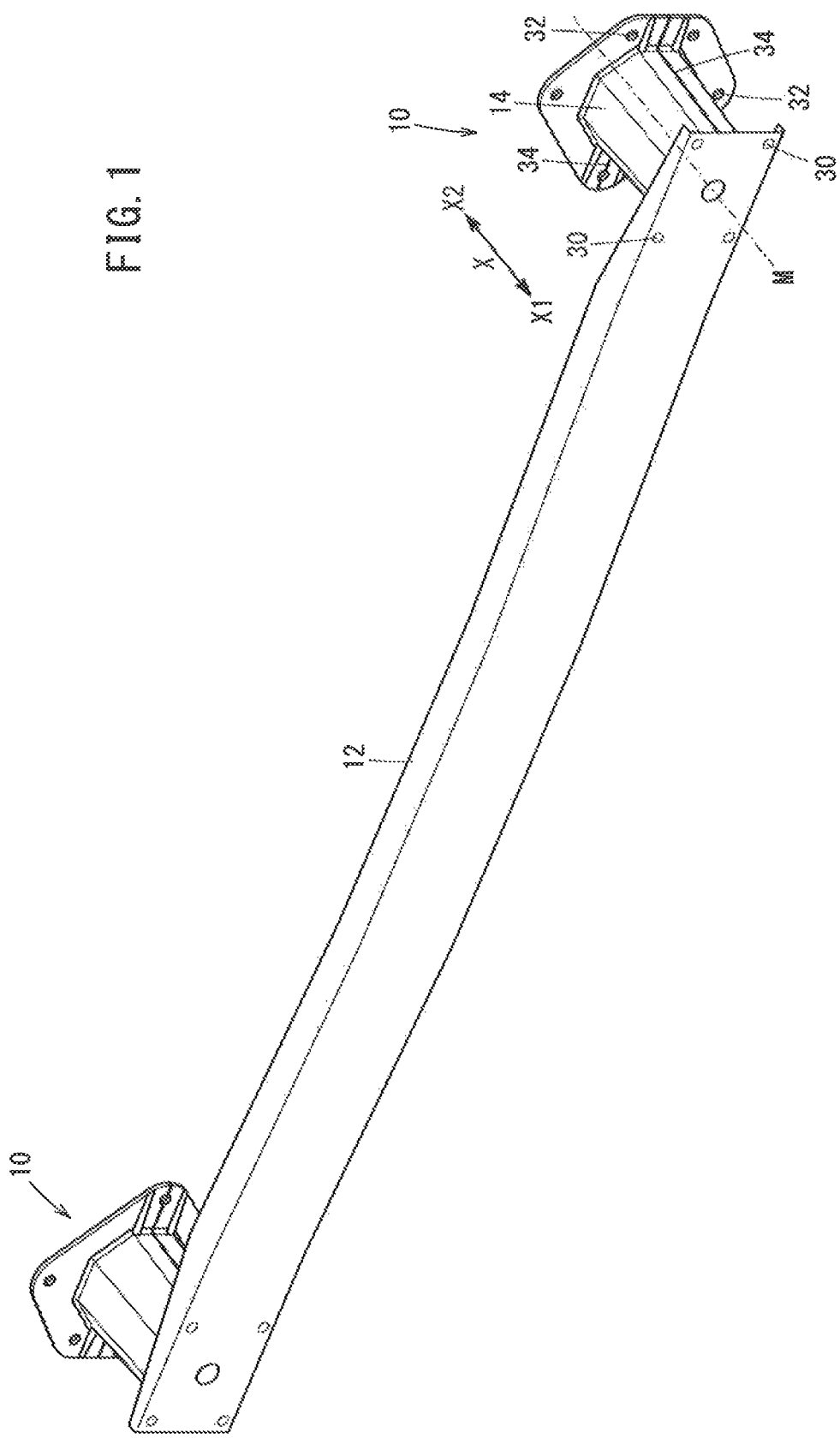
FIG. 1 is a schematic perspective view of a bumper beam on which energy absorbers according to a first embodiment of the present invention are mounted.
Figure 2:
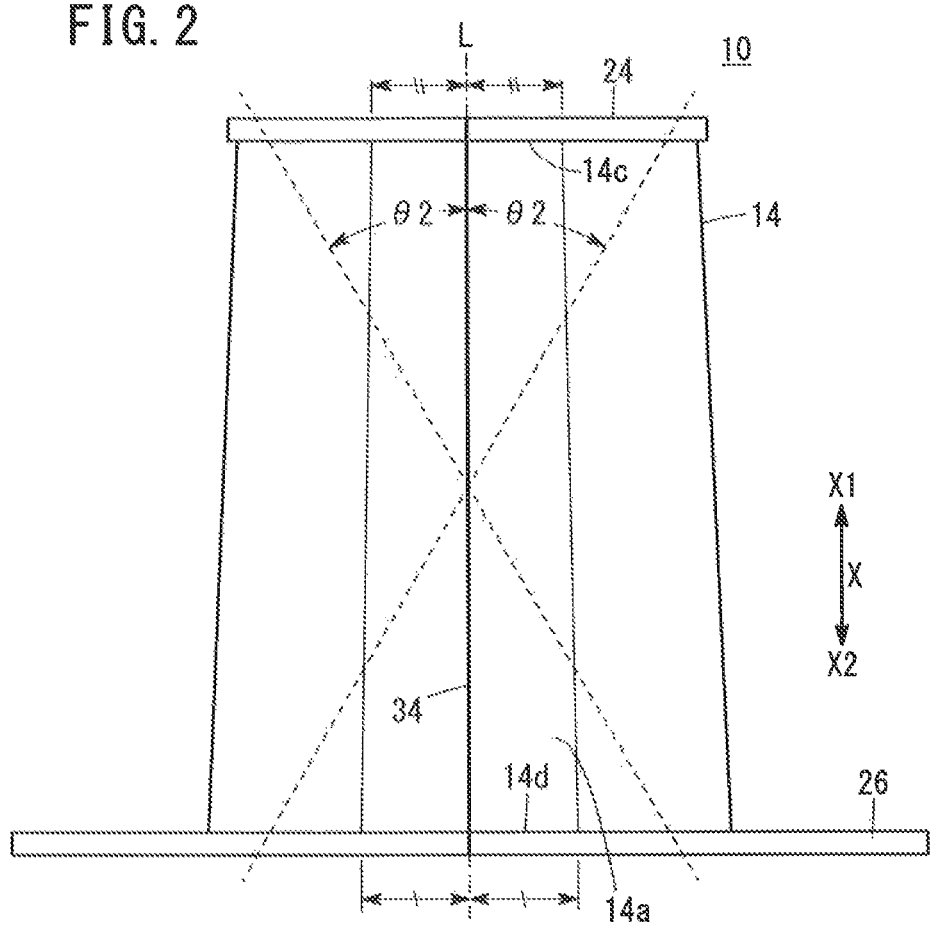
FIG. 2 is a schematic front elevational view of one of the energy absorbers shown in FIG. 1.
Figure 3:
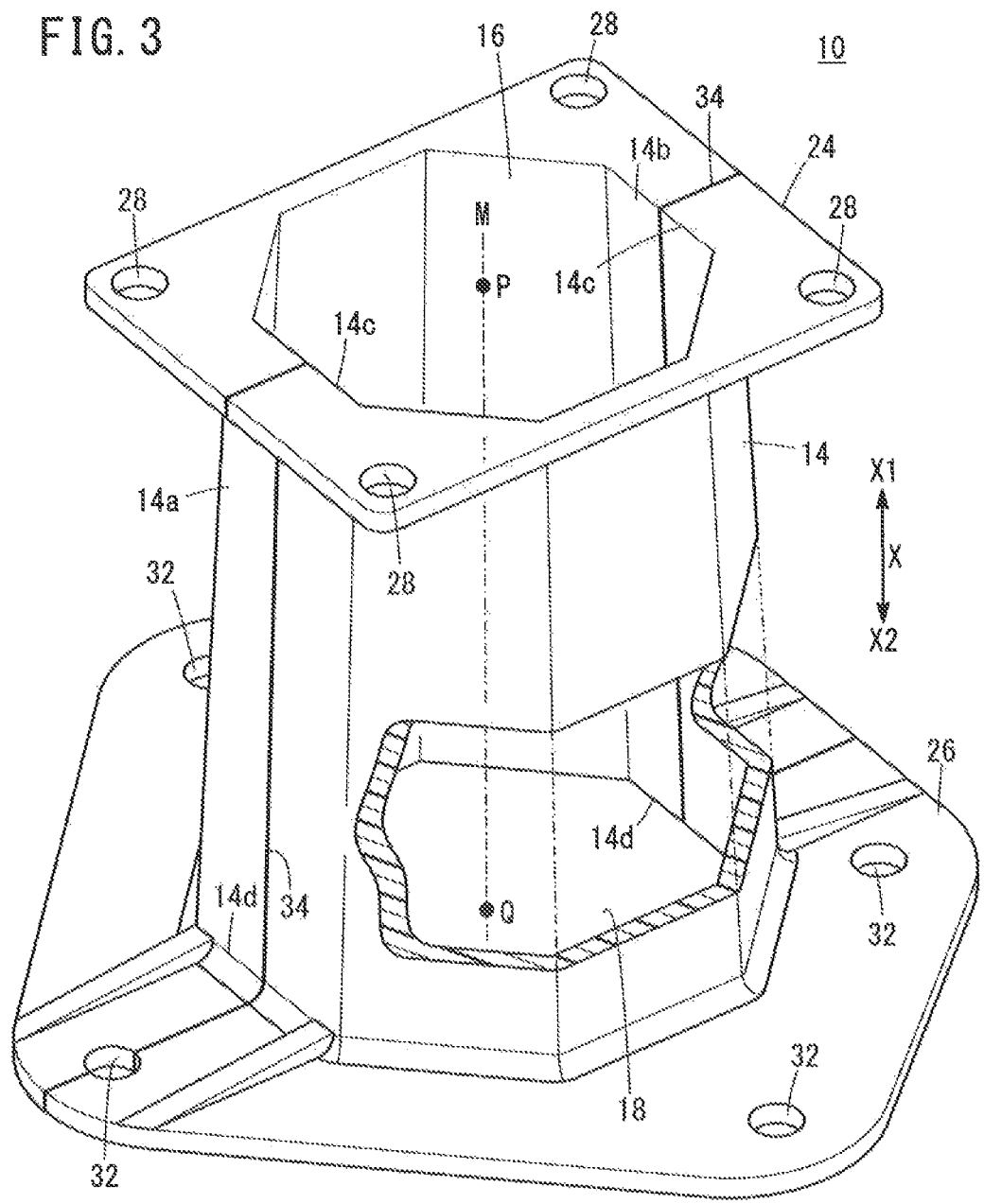
FIG. 3 is a schematic perspective view of the energy absorber shown in FIG. 1.
Figure 4:
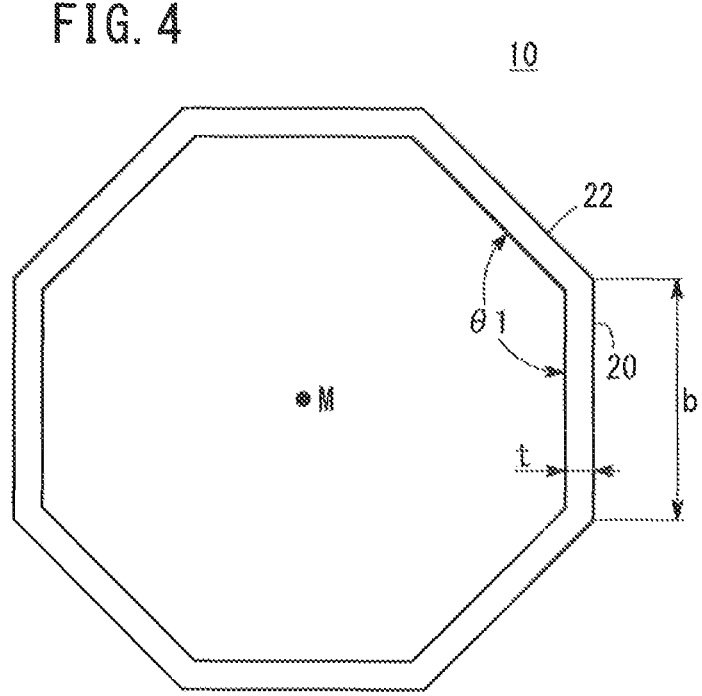
FIG. 4 is a schematic cross-sectional view showing the shape of a horizontal cross section of a main body of the energy absorber shown in FIG. 1.

An energy absorber 10 according to a first embodiment of the present invention will be described below with reference to FIGS. 1 through 4. FIG. 1 is a schematic perspective view of a bumper beam 12 on which a set of energy absorbers 10 are mounted. FIG. 2 is a schematic front elevational view of the energy absorber 10. FIG. 3 is a schematic perspective view of the energy absorber 10. FIG. 4 is a schematic cross-sectional view showing the shape of a horizontal cross section of a main body 14 of the energy absorber 10. In FIGS. 1 through 3, the directions along which a vehicle body (not shown) travels are shown as the directions indicated by the arrow X, the forward direction being denoted by X1 and the rearward direction by X2. A load is applied to the energy absorbers 10 from the X1 side toward the X2 side along the directions indicated by the arrow X.

As shown in FIG. 1, the energy absorbers 10 are mounted on the respective opposite ends of the bumper beam 12 by screws or bolts, to be described later. As also shown in FIGS. 2 and 3, the energy absorber 10 has a main body 14 of a closed cross-sectional structure. According to the first embodiment, the main body 14 is of a hollow tapered octagonal prismatic shape which is progressively spread from the X1 side toward the X2 side along the directions indicated by the arrow X. However, the main body 14 is not limited to such a shape. The main body 14 may have its dimensions remaining the same from the X1 side toward the X2 side along the directions indicated by the arrow X. The main body 14 may also of any of various prismatic shapes rather than the octagonal prismatic shape.

As shown in FIG. 3, the main body 14 has, in opposite ends thereof, openings 16, 18 of octagonal shapes. If it is assumed that a straight line interconnecting the inner centers P, Q of the openings 16, 18 is regarded as a central axis M, then the main body 14 is of an axial symmetrical shape whose symmetry axis is represented by the central axis M. The main body 14 has side surfaces 14a, 14b where weld lines 34, to be described later, are formed. Each of the side surfaces 14a, 14b is defined by four sides including two opposite sides 14c, 14d that are located on two opposite end sides of the main body 14. A line interconnecting the midpoints of the sides 14c, 14d is regarded as a reference line L. In this case, the energy absorber 10 is mounted on the vehicle body or the like so that the reference line L is oriented along the directions indicate by the arrow X, or stated otherwise, along the directions in which a load is applied.

As shown in FIG. 4, the horizontal cross section of the main body 14 is of a hollow octagonal shape. On at least a side wall of the main body 14, the thickness t and the length b of a first side 20, which is one side of the octagonal shape, has a relationship of $t/b \geq 0.045$. The first side 20 and a second side 22 adjacent to the first side 20 form therebetween an angle $\theta 1$ of 150° or less. The first side 20 is not limited to being straight, but may be curved. In the case of curved line, the length b is defined as the length of a straight line segment interconnecting the opposite ends of the first side 20.

As shown in FIG. 2, the main body 14 has a first flange 24 formed integrally therewith on the edge of the opening 16 positioned on one end side (X1 side), and a second flange 26 formed integrally therewith on the edge of the opening 18 positioned on the other end side (X2 side). The first flange 24 has a plurality of bolt holes 28 defined therein for passage therethrough of bolts (not shown). These bolt holes 28 and a plurality of bolt holes 30 defined in the bumper beam 12 are aligned in position with each other, and then bolts are inserted through those positionally-aligned bolt holes and threaded into corresponding nuts (not shown), thereby installing the X1 side of the energy absorbers 10 on the bumper beam 12.

As is the case with the first flange 24, the second flange 26 also has a plurality of bolt holes 32 defined therein, and is fastened and fixed to a predetermined region on the vehicle body by bolts inserted through the bolt holes 32.

Since the energy absorber 10 is formed by injection-molding as described above, weld lines 34 are formed respectively on the side surfaces 14a, 14b in regions where flows of molten resin join each other and are fused together when the energy absorber 10 is injection-molded. The side surfaces 14a, 14b face each other across the openings 16, 18 of the energy absorber 10.

Each of the weld lines 34 is inclined with respect to the reference line L at a tilt angle $\theta 2$ ranging from $-35°$ to $35°$. Stated otherwise, the absolute value of the tilt angle $\theta 2$ is equal to or smaller than $|35°|$. In FIGS. 1 through 3, the tilt angle $\theta 2$ is illustrated as $0°$.

Figure 5:
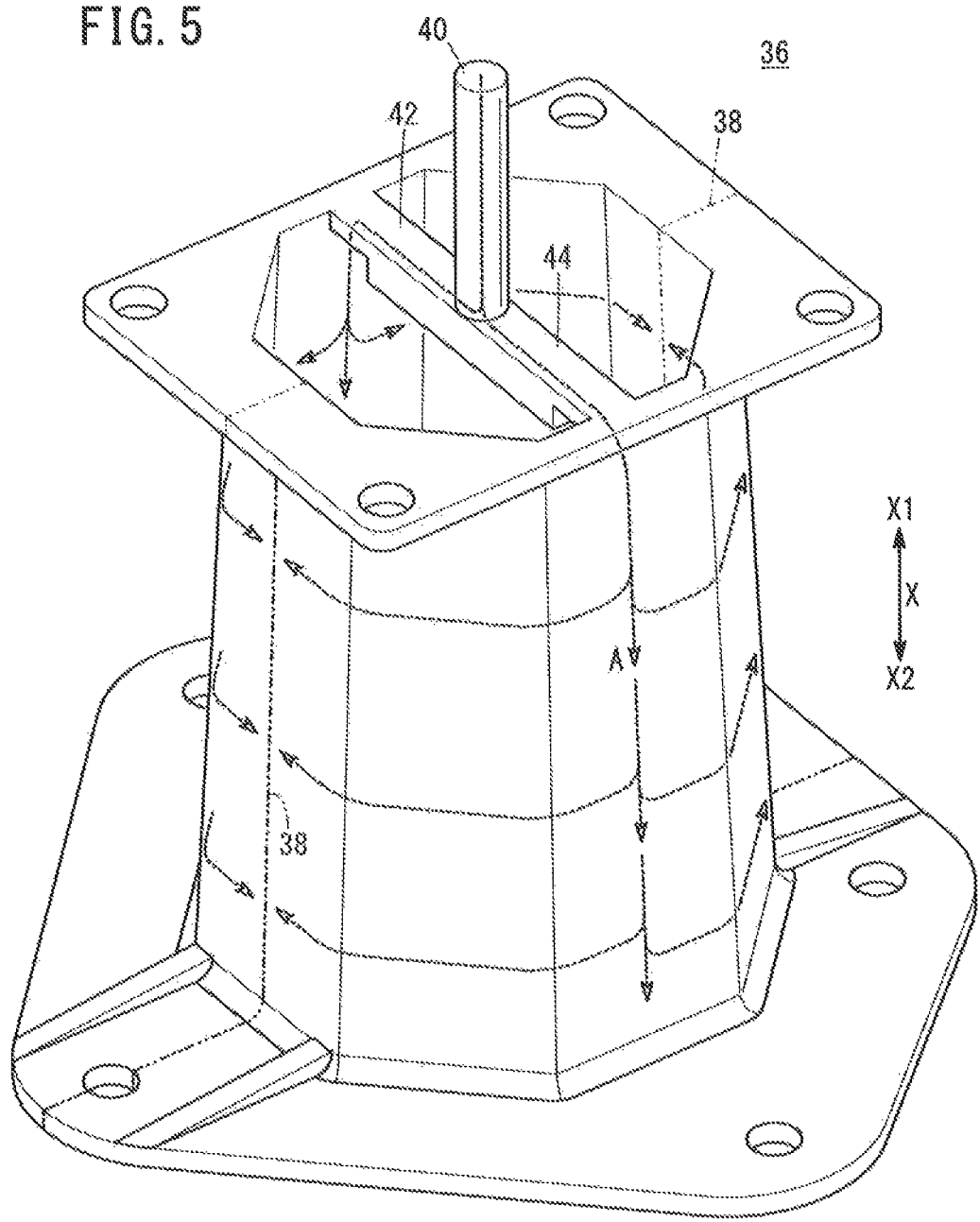
FIG. 5 is a schematic perspective view of a mold cavity for use in injection-molding the energy absorber shown in FIG. 1.

A process of manufacturing the energy absorber 10 with the weld lines 34 positioned in such a layout includes an injection molding process, for example, which employs a mold assembly (not shown) capable of forming a mold cavity 36 shown in FIG. 5, for example. On the mold cavity 36 shown in FIG. 5, the two-dot-and-dash lines indicate regions where the weld lines are expected to be formed when the energy absorber 10 is molded, and such regions will be hereinafter referred to as projected weld line forming regions 38. That is, on the projected weld line forming regions 38, the weld lines 34 will be formed when the energy absorber 10 is molded.

As shown in FIG. 5, the mold cavity 36 is of such a shape as to be able to obtain the energy absorber 10 by an integral injection molding. A sprue 40 for supplying molten resin to the mold cavity 36 is held in fluid communication with the mold cavity 36, and extends substantially parallel to the reference line L. The sprue 40 has its lower end bifurcated into a set of runners 42, 44 extending straight in opposite directions away from the sprue 40. The runners 42, 44 are held in fluid communication with the mold cavity 36 in opposite relation to each other in a plane perpendicular to a plane passing through both the projected weld line forming regions 38.

Molten resin that is supplied to the sprue 40 flows through the runners 42, 44 and then flows from the runners 42, 44 into the mold cavity 36, progressively filling the mold cavity 36. In the mold cavity 36, the molten resin flows around along different directions as indicated by the arrow A. Specifically, flows of the molten resin flowing in from the runner 42 and flows of the molten resin flowing in from the runner 44 join each other at the projected weld line forming regions 38, which are located at intermediate positions between those molten resin flows. The joined molten resin flows are fused together, thereby forming weld lines 34 in the projected weld line forming regions 38.

In the above injection molding process, the weld lines 34 that extend along the reference line L are formed. If the flows of the molten resin in the mold cavity 36 vary as manufacturing variation during the injection molding process, then the weld lines 34 may possibly contain meandering portions. In this case, an error between the setting value and the measured value of the tilt angle $\theta 2$ may occur within a range of $\pm 10°$.

After the molten resin in the mold cavity 36 has solidified, the mold assembly is opened, and then the molded energy absorber 10 is obtained. The process of manufacturing the energy absorber 10 is not limited to the above molding process, but may be any of various processes insofar as they can form the weld lines 34 in the above layout.

Since the energy absorber 10 is mounted on the vehicle body or the like such that a load is applied to the energy absorber 10 along the reference line L as described above, a plane that is inclined with respect to the reference line L at $\pm 45°$ is a principal shear stress plane. Therefore, in order to prevent the weld lines 34, which are lower in mechanical strength than the other regions, from being disposed on the principal shear stress plane, it is necessary to avoid the tilt angle $\theta 2$ becoming $\pm 45°$. In view of the above error that may possibly occur within the range of $\pm 10°$ between the setting value and the measured value of the tilt angle $\theta 2$, the setting value of the tilt angle $\theta 2$ may be set to $-55°$ or smaller, within a range from $-35°$ to $35°$, or to $55°$ or greater.

Figure 6:
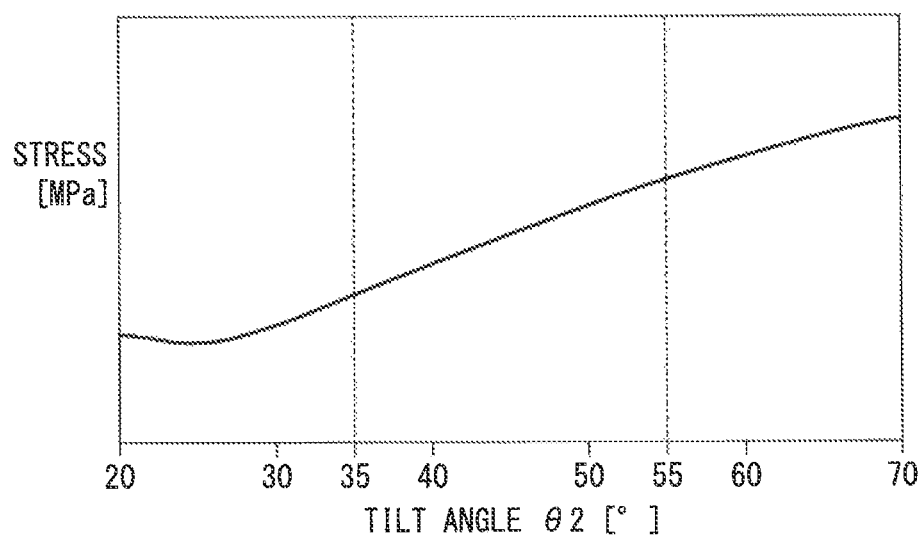
FIG. 6 is a diagram showing the relationship between the absolute value of a tilt angle and stress that is imposed on a weld line when bending force is applied to the energy absorber.

The direction along which a load is applied to the energy absorber 10 may be inclined with respect to the direction along the reference line L at an angle of about $\pm 30°$, for example. Specifically, a bending force due to an oblique load may be applied to the energy absorber 10. The relationship between tilt angle $\theta 2$ and stress applied to the weld lines 34 at the time a bending force is applied to the energy absorber 10 is shown in FIG. 6. The horizontal axis of FIG. 6 represents absolute value of the tilt angle $\theta 2$, and the vertical axis thereof represents stress obtained by dividing tensile load imposed on the weld line 34 by the bending force by the cross-sectional area of the main body 14 along the weld line 34.

It can be understood from FIG. 6 that as the absolute value of the tilt angle $\theta 2$ approaches $|90°|$, the stress applied to the weld lines 34 tends to increase, and that the stress applied when the absolute value of the tilt angle $\theta 2$ is $|55°|$, is approximately twice as large as when the absolute value of the tilt angle $\theta 2$ is $|35°|$. This is believed to occur for the following reasons: The energy absorber 10 has a long side along the reference line L of the main body 14 and a short side perpendicular to the reference line L thereof. As the absolute value of the tilt angle $\theta 2$ increases and approaches $|90°|$, the direction along which the weld lines 34 extend approaches a direction parallel to the short side of the main body 14. As a result, the length of the weld lines 34 is reduced, and the cross-sectional area of the main body 14 along the weld lines 34 also decreases. Consequently, as the absolute value of the tilt angle $\theta 2$ increases, the tensile load applied to the weld lines 34 by the bending force increases, resulting in an increase in the stress applied to the weld lines 34.

In view of the foregoing, in order to prevent an excessive bending force from being imposed on the weld lines 34 when an oblique load is applied, the absolute value of the tilt angle $\theta 2$ in the energy absorber 10 is set to $|35°|$ or less. Specifically, in the absolute value of the tilt angle $\theta 2$, the range of $|55°|$ or higher is excluded from the range in which the tilt angle $\theta 2$ is not $\pm 45°$ in view of the above manufacturing variations.

As described above, the energy absorber 10 is set such that the thickness t and the length b of at least a side wall of the main body 14, i.e., the first side 20, have the relationship of $t/b \geq 0.045$, and the angle $\theta 1$ formed between the first side 20 and the second side 22 is $150°$ or less. This makes it possible to increase the buckling strength of the energy absorber 10 with respect to the direction along which the load is applied. In addition, when a load is applied, the energy absorber 10 is prevented from being deformed in an out-of-plane direction of a cross section perpendicular to the reference line L.

If the angle $\theta 1$ formed between the first side 20 and the second side 22 exceeds $150°$, then the first side 20 and the second side 22 essentially function as a single side. In other words, the angle $\theta 1$ is approximated by $180°$. As the value of the length b increases accordingly, the value t/b is reduced, making it difficult to satisfy $t/b \geq 0.045$. With the energy absorber 10 according to the present embodiment, however, since the angle θ1 is equal to or smaller than 150°, it is possible to easily satisfy t/b≥0.045.

Figure 7:
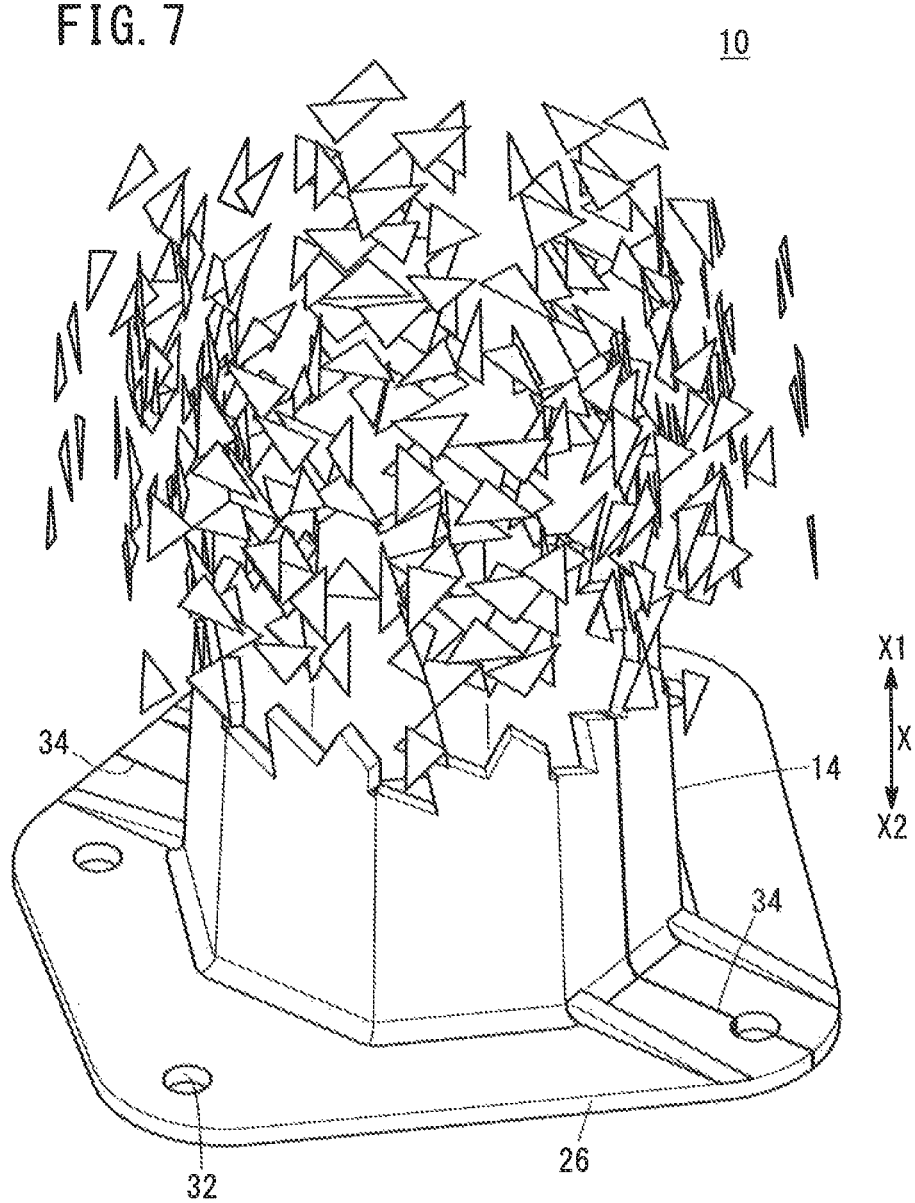
FIG. 7 is a schematic perspective view illustrating the manner in which the main body of the energy absorber shown in FIG. 1 is compressively fractured.

The energy absorber 10 is thus capable of being prevented from cracking or being damaged at the weld lines 34. Furthermore, when a load is applied to the energy absorber 10, the energy absorber 10 is prevented from being buckled or deformed. As a result, as shown in FIG. 7, the energy absorber 10 can be compressively fractured while being broken into pieces.

FIG. 8 shows a solid-line curve representing a displacement-load diagram of the energy absorber 10 in a case that the energy absorber 10 absorbs the energy by being compressively fractured as described above. Specifically, the horizontal axis of FIG. 8 represents displacement in a direction along the reference line L of the energy absorber 10, and the vertical axis thereof represents the magnitude of load applied to the energy absorber 10. By way of comparison, FIG. 8 also shows a broken-line curve representing a displacement-load diagram of an energy absorber where the energy absorber cracks or is damaged at the weld lines 34 in its process of absorbing the applied energy, for example.

It is obvious from FIG. 8 that the energy absorber 10, which is capable of absorbing the energy by being compressively fractured as described above, can absorb the energy efficiently compared with the energy absorber where the energy absorber cracks at the weld lines 34.

FIG. 9 shows the results of an analysis of the energy absorber 10 at the time a bending force based on an oblique load applied at an inclination angle of ±30° relative to the direction along the reference line L is applied to the energy absorber 10. The solid-line curve in FIG. 9 represents a displacement-load diagram obtained by a simulation of the energy absorber 10 where the absolute value of the tilt angle θ2 is |35°|. By way of comparison, the broken-line curve in FIG. 9 represents a displacement-load diagram obtained by a simulation of an energy absorber A where the absolute value of the tilt angle θ2 is |55°|. Furthermore, by way of comparison, the dot-and-dash-line curve in FIG. 9 represents a displacement-load diagram obtained by a simulation of an energy absorber B which is free of weld lines 34. Specifically, the horizontal axis of FIG. 9 represents displacement in the direction of the oblique load of the energy absorber, and the vertical axis thereof represents the magnitude of oblique load applied to the energy absorber.

It has been confirmed from FIG. 9 that the energy absorber A, in which the absolute value of the tilt angle θ2 is |55°|, underwent an abrupt reduction in the load due to cracking at the weld lines in the process of absorbing the energy. The abrupt reduction in the load indicates that if the absolute value of the tilt angle θ2 is equal to or greater than |55°|, the bending force applied to the weld lines becomes excessive so that it becomes easy to break the energy absorber at the weld lines.

Further, it has been confirmed that the energy absorber 10, in which the absolute value of the tilt angle θ2 is |35°|, was able to absorb the energy essentially in the same manner as the energy absorber B which is free of weld lines 34. In other words, the energy absorber 10 does not crack at the weld lines 34, and is thus capable of efficiently absorbing the energy by way of a compressive fracture.

The energy absorber 10 according to the present embodiment is capable of effectively preventing the weld lines 34 from being disposed on the principal shear stress plane even upon occurrence of manufacturing variations. Furthermore, even when an oblique load along a direction inclined from the reference line L is applied to the energy absorber 10, an excessive bending force is prevented from being applied to the weld lines 34. As a consequence, since the energy absorber 10 is prevented from being broken at the weld lines 34, the energy absorber 10 is able to efficiently absorb the energy while being compressively fractured.

From the foregoing, the energy absorber 10 according to the first embodiment can efficiently be produced by injection molding and can efficiently absorb the applied energy.

Second Embodiment

A main body 46 of an energy absorber according to a second embodiment of the present invention will be described below with reference to FIGS. 10A and 10B. FIG. 10A is a schematic perspective view of the main body 46, and FIG. 10B is a schematic front elevational view of the main body 46. For convenience of explanation, other components than the main body 46 of the energy absorber according to the second embodiment are omitted from illustration in FIGS. 10A and 10B.

The energy absorber according to the second embodiment is structurally identical to the above energy absorber 10 except for the main body 46 that is provided instead of the main body 14 among the components of the energy absorber 10. The main body 46 is of a closed cross-sectional structure having openings 48, 50 in its opposite ends which are of a quadrangular shape. The main body 46 is also different from the above main body 14 in that the main body 46 is asymmetrical with respect to a central axis M interconnecting the inner centers P, Q of the openings 48, 50.

The main body 46 has weld lines 52 on respective side surfaces 46a, 46b that face each other across the openings 48, 50. Each of the side surfaces 46a, 46b is defined by four sides including two opposite sides 46c, 46d that are located on two opposite end sides of the main body 46. A line interconnecting the midpoints of the sides 46c, 46d of these four sides is regarded as a reference line L.

With the main body 46, the reference line L is inclined with respect to the directions indicated by the arrow X along which a load is mainly applied. As is the case with the above energy absorber 10, the tilt angle θ2 of the weld lines 52 with respect to the reference line L is set to a value in a range from −35° to 35°. In FIGS. 10A and 10B, the tilt angle θ2 is also illustrated as 0°.

Therefore, the weld lines 52 are effectively prevented from being disposed on the principal shear stress plane even in view of manufacturing variations. Furthermore, even when a load along a direction inclined from the directions indicated by the arrow X is applied to the energy absorber, an excessive bending force is prevented from being applied to the weld lines 52.

Moreover, as is the case with the above main body 14, t/b≥0.045 is satisfied on at least some of the side walls of the main body 46, and the angle θ1 is set to be equal to or smaller than 150°. As a result, the energy absorber can efficiently absorb the applied energy by the main body 46 being compressively fractured while being broken into pieces.

The energy absorber which has the asymmetrical main body 46 can be produced by injection molding as is the case with the energy absorber 10 according to the first embodiment. In other words, the weld lines 52 can easily be disposed as described above by adjusting the layout of the sprue and the runners with respect to the mold cavity.

From the foregoing, the energy absorber according to the second embodiment can also efficiently be produced by injection molding and can efficiently absorb the applied energy while preventing the energy absorber from cracking or being damaged at the weld lines 52.

Third Embodiment

Figure 11B:
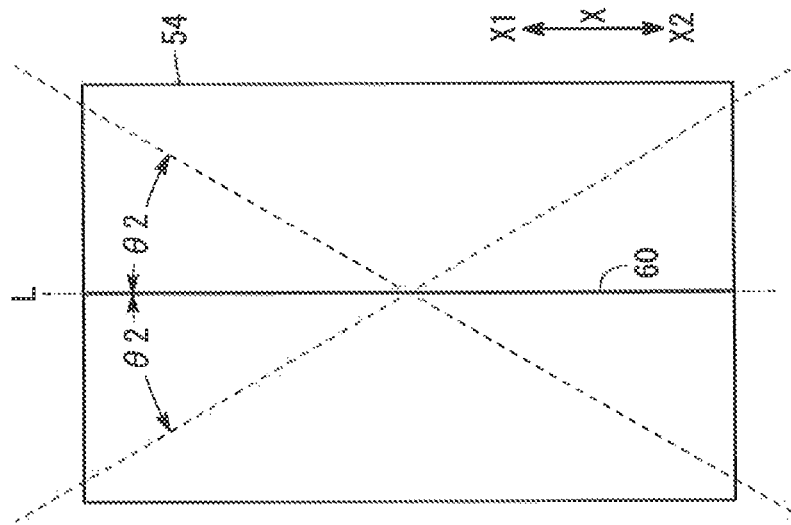
FIG. 11B is a schematic front elevational view of the main body shown in FIG. 11A.
Figure 11A:
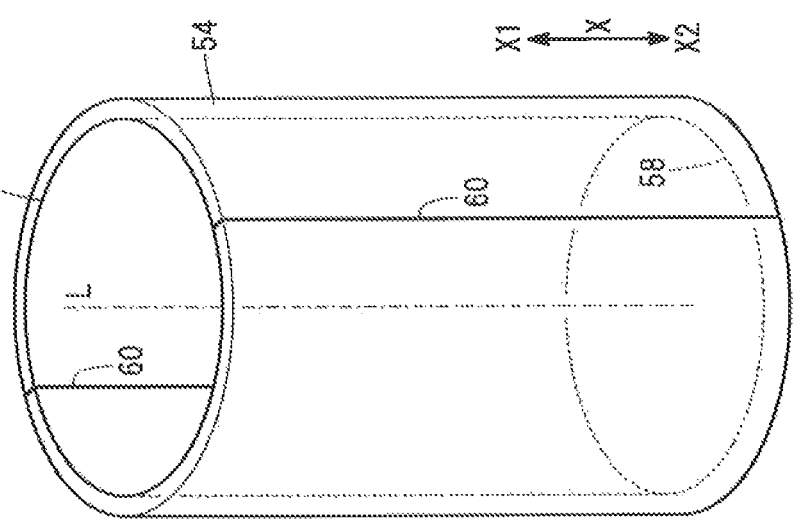
FIG. 11A is a schematic perspective view of the main body of an energy absorber according to a third embodiment of the present invention.

A main body 54 of an energy absorber according to a third embodiment of the present invention will be described below with reference to FIGS. 11A and 11B. FIG. 11A is a schematic perspective view of the main body 54, and FIG. 11B is a schematic front elevational view of the main body 54. For convenience of explanation, other components than the main body 54 of the energy absorber according to the third embodiment are omitted from illustration in FIGS. 11A and 11B.

The energy absorber according to the third embodiment is structurally identical to the above energy absorber 10 except for the main body 54 that is provided instead of the main body 14 among the components of the energy absorber 10. The main body 54 is of a closed cross-sectional structure having openings 56, 58 in its opposite ends which are of a circular shape. The main body 54 is different from the above main bodies 14, 46 in that the main body 54 is of a hollow cylindrical shape. The main body 54 is of an axial symmetrical shape whose symmetric axis is represented by the axial line thereof.

The main body 54 has a set of weld lines 60 on respective circumferential surfaces which face each other across the openings 56, 58. The tilt angle θ2 of the weld lines 60 is set to a value in a range from −35° to 35° with respect to the reference line L that extends along the axial line of the main body 54. In FIGS. 11A and 11B also, the tilt angle θ2 is illustrated as 0°.

As described above, the main body 54 which is of an axial symmetrical shape whose symmetric axis is represented by the axial line is mounted on the vehicle body or the like such that a load is applied along the axial directions. Therefore, by setting the tilt angle θ2 of the weld lines 60 with respect to the reference line L, which extends along the axial directions, to fall within the above range, the weld lines 60 are prevented from being disposed on the principal shear stress plane even in view of manufacturing variations.

Furthermore, even when the applied direction of a load is inclined from a direction along the reference line L and a bending force based on the oblique load is applied to the energy absorber, an excessive bending force is prevented from being applied to the weld lines 60.

The energy absorber according to the present invention is not particularly limited to the above embodiments, but various changes and modifications may be made therein without departing from the scope of the present invention.

For example, according to the third embodiment, the main body 54 is of a hollow cylindrical shape of axial symmetry. Instead, the main body may be of a hollow cylindrical shape which is asymmetrical with respect to the axial line, for example, such that the main body includes portions where the tilt angles of the circumferential surfaces of the portions with respect to the end face are different from each other in the circumferential direction. Even such a main body structure offers the same advantages as the energy absorber which has the main body 54 that is of a hollow cylindrical shape of axial symmetry.

Even when a main body of a hollow cylindrical shape that is asymmetrical is to be injection-molded, the tilt angle with respect to the reference line can be adjusted relatively easily. Consequently, even when a main body is injection-molded with the tilt angle of weld lines thereof being set as desired, it is possible to prevent the production efficiency of the energy absorber from being lowered.

The energy absorber 10 according to the first embodiment described above has a set of (two) weld lines 34 which face each other across the openings 16, 18. However, the number of the weld lines 34 is not limited thereto, but may be set to various values depending on the shape of the energy absorber 10 and the efficiency of the injection molding process. Even a single or three or more weld lines 34 offer the same advantages as the two weld lines 34 by setting the tilt angle θ2 with respect to the reference line L within the range from −35° to 35°. The same applies to the weld lines 52, 60 of the energy absorbers according to the second and third embodiments.

In the first through third embodiments, the energy absorbers are mounted on the bumper beam 12 on the front portion of the automobile body. However, the energy absorbers are not limited to being mounted on such a position. For example, the energy absorbers that are mounted on a portion of the automobile body other than the front portion thereof also offers the same advantages.

[Bumper Structural Body]

A bumper structural body according to a preferred embodiment of the present invention will be described in detail below with reference to FIGS. 12 through 21 of the accompanying drawings.

Figure 12:
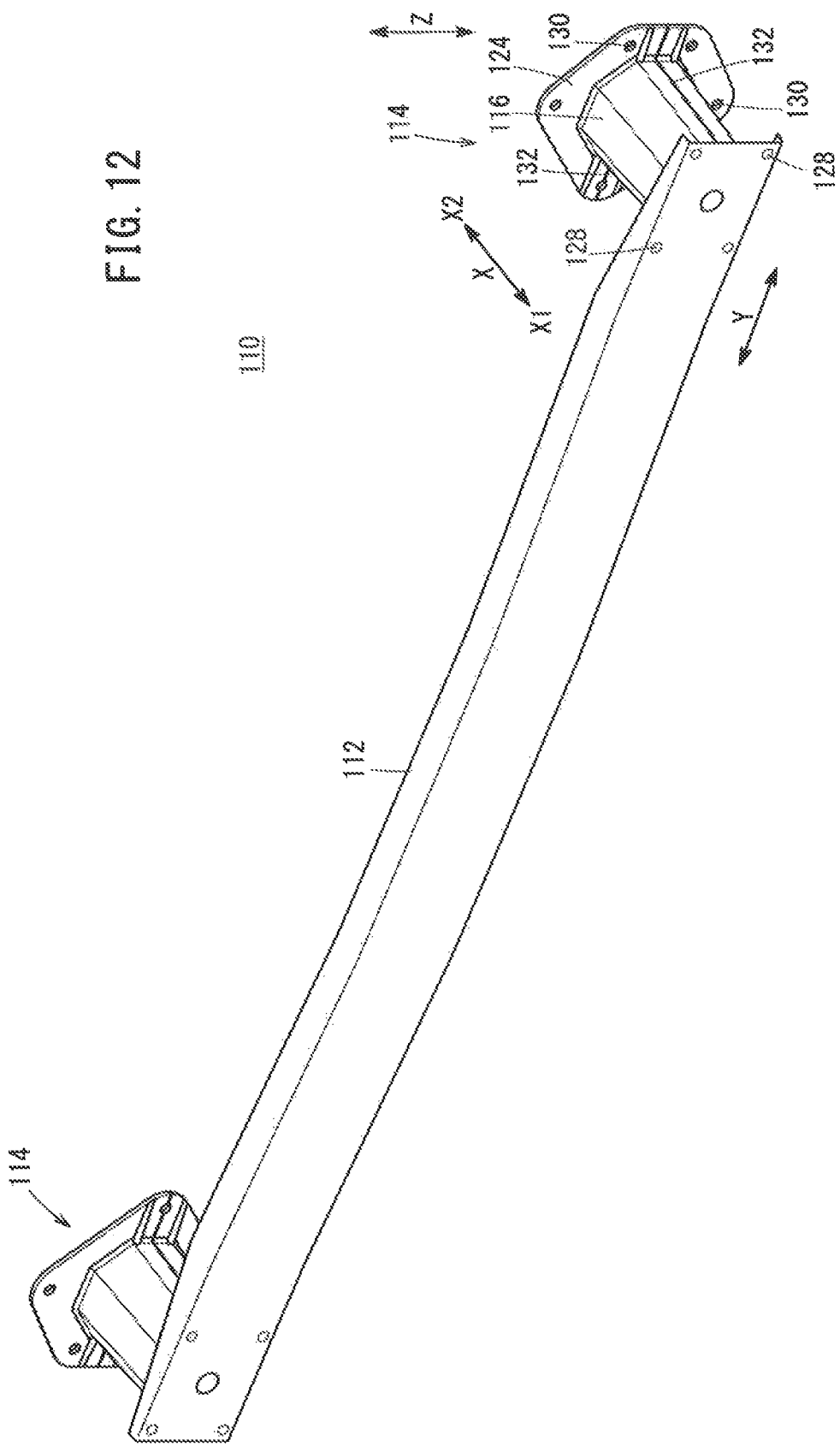
FIG. 12 is a schematic perspective view of a bumper structural body according to an embodiment of the present invention.
Figure 13:
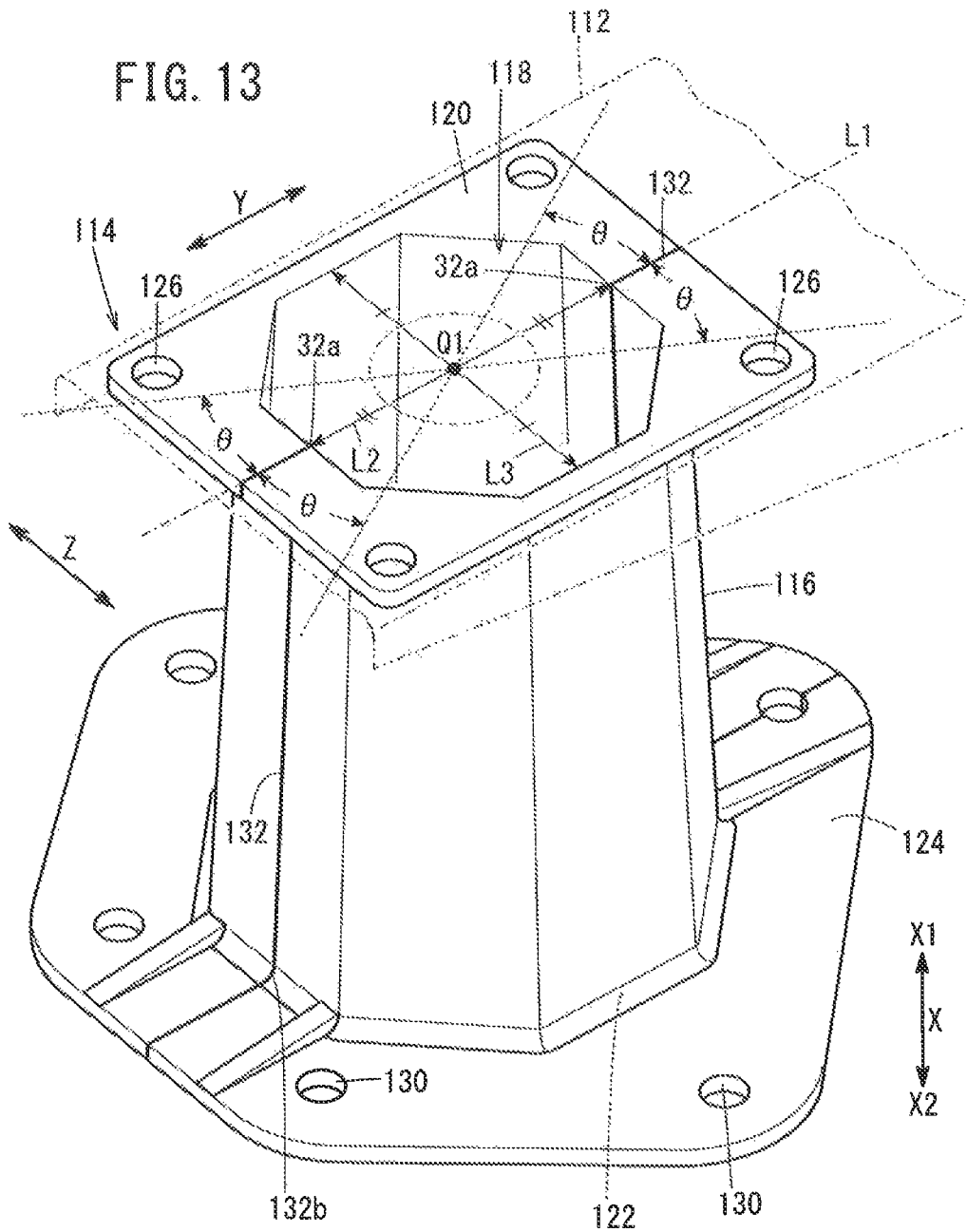
FIG. 13 is an enlarged fragmentary perspective view of the bumper structural body shown in FIG. 12.

The bumper structural body according to the present invention is attached, for example, to each of the front and rear portions of an automobile body or the like. The bumper structural body, upon being subjected to a load such as an impact force or the like applied thereto, serves to absorb energy of the load. An example wherein the bumper structural body, denoted by 110, according to the present embodiment is attached to the front portion of an automobile body (not shown) will be described below with reference to FIGS. 12 and 13. FIG. 12 is a schematic perspective view of the bumper structural body 110, and FIG. 13 is an enlarged fragmentary perspective view of the bumper structural body 110. For convenience of explanation, a bumper beam 112 is shown by the two-dot-and-dash lines.

In FIGS. 12 and 13, the forward direction of the longitudinal directions X of the vehicle body (not shown) is denoted by X1, and the rearward direction by X2. A load is mainly applied to the bumper structural body 110 from the X1 side toward the X2 side along the longitudinal directions X.

As shown in FIG. 12, in the bumper structural body 110, energy absorbers 114 are mounted respectively on the opposite ends of the bumper beam 112 in the direction in which the bumper beam 112 extends. As described later, the bumper structural body 110 is mounted on a vehicle body such that the bumper beam 112 extends along transverse directions Y of the vehicle body, and a main body 116 of each of the energy absorbers 114 extends along the longitudinal directions X.

The bumper beam 112 is made of a metal material such as aluminum alloy, high-tensile steel, or the like, or a fiber-reinforced resin or the like, and extends along the transverse directions Y. The bumper beam 112 absorbs the applied energy by being deformed depending on the direction in which the above load is applied.

Each of the energy absorbers 114 is produced by injection-molding a fiber-reinforced thermoplastic. The matrix resin of the fiber-reinforced thermoplastic is not limited to any materials, but may be selected, depending on applications, from a variety of thermoplastics including polyamide resin, polyvinyl chloride resin, polypropylene resin, styrol resin, ABS resin, fluorine resin, polycarbonate resin, acetal resin, etc.

The reinforcing fibers should preferably comprise inorganic fibers such as glass fibers, carbon fibers, or the like, or organic fibers such as aramid fibers, cellulose fibers, or the like. If the bumper beam 112 is made of metal, then the reinforcing fibers should preferably exhibit an electric insulation property in order to avoid concerns about electrolytic corrosion. The length of the reinforcing fibers may be in the range from 1.0 to 2.0 mm, for example, though it is not limited to that range, and may be set to any value insofar as it allows the fiber-reinforced thermoplastic to be injection-molded.

As shown in FIG. 13, the energy absorber 114 has a main body 116 of a closed cross-sectional structure. According to the present embodiment, the main body 116 is of a hollow tapered octagonal prismatic shape which is progressively spread from the front end (X1 side) toward the rear end (X2 side) thereof along the longitudinal directions X. However, the main body 116 is not limited to such a shape. The main body 116 may have its dimensions remaining the same from the front end toward the rear end thereof along the longitudinal directions X. The main body 116 may also of any of various prismatic shapes and hollow cylindrical shapes rather than the octagonal prismatic shape.

The main body 116 has a first flange 120 formed integrally therewith on the edge of an opening 118 in the front end thereof, and a second flange 124 formed integrally therewith on the edge of an opening 122 in the rear end thereof. The first flange 120 has a plurality of bolt holes 126 defined therein for passage therethrough of bolts (not shown). These bolt holes 126 and a plurality of bolt holes 128 defined in the bumper beam 112 are aligned in position with each other, and then bolts are inserted through those positionally-aligned bolt holes and threaded into nuts (not shown), thereby installing an end of the energy absorber 114 on the X1 side to the bumper beam 112.

As is the case with the first flange 120, the second flange 124 also has a plurality of bolt holes 130 defined therein, and is fastened and fixed to a predetermined region on the vehicle body by bolts inserted through the bolt holes 130. Specifically, a front end of the main body 116 of the energy absorber 114 is attached to the bumper beam 112, and the other end thereof is attached to a frame or the like of the vehicle body.

The set of energy absorbers 114 thus position and fix the bumper beam 112 on the vehicle body by supporting the opposite ends of the bumper beam 112 in the direction (transverse direction Y) in which the bumper beam 112 extends.

Since the energy absorber 114 is produced by injection-molding as described above, weld lines 132 are formed in regions where flows of molten resin join each other and are fused together when the energy absorber 114 is injection-molded. A set of (two) weld lines 132 are formed at positions that face each other across the openings 118, 122 in the transverse directions Y.

Each of the weld lines 132 is disposed on the energy absorber 114 so as to extend along the longitudinal directions X. Therefore, each of the weld lines 132 has an end 132a disposed on the front end of the energy absorber 114 and another end 132b disposed on the rear end of the energy absorber 114 at a location that is positioned face-to-face with the end 132a along the longitudinal directions X.

The weld line 132 is disposed such that the tilt angle $\theta$ of a layout line L1 with respect to the extending directions (first imaginary line L2) of the bumper beam 112 is equal to or less than 30°. The layout line L1 represents an imaginary line passing through the intersection Q1 between the first imaginary line L2 and a second imaginary line L3 and the end 132a of the weld line 132.

The first imaginary line L2 represents an imaginary line extending along the transverse directions Y (the directions along which the bumper beam 112 extends) through a first midpoint that is a midpoint between the upper and lower ends of the front opening 118 in the main body 116 along vertical directions Z of the vehicle body. The second imaginary line L3 represents an imaginary line extending along the vertical directions Z through a second midpoint that is a midpoint between one end and the other end of the front opening 118 in the transverse directions Y. In FIGS. 12 and 13, the tilt angle $\theta$ is illustrated as 0°.

Figure 14:
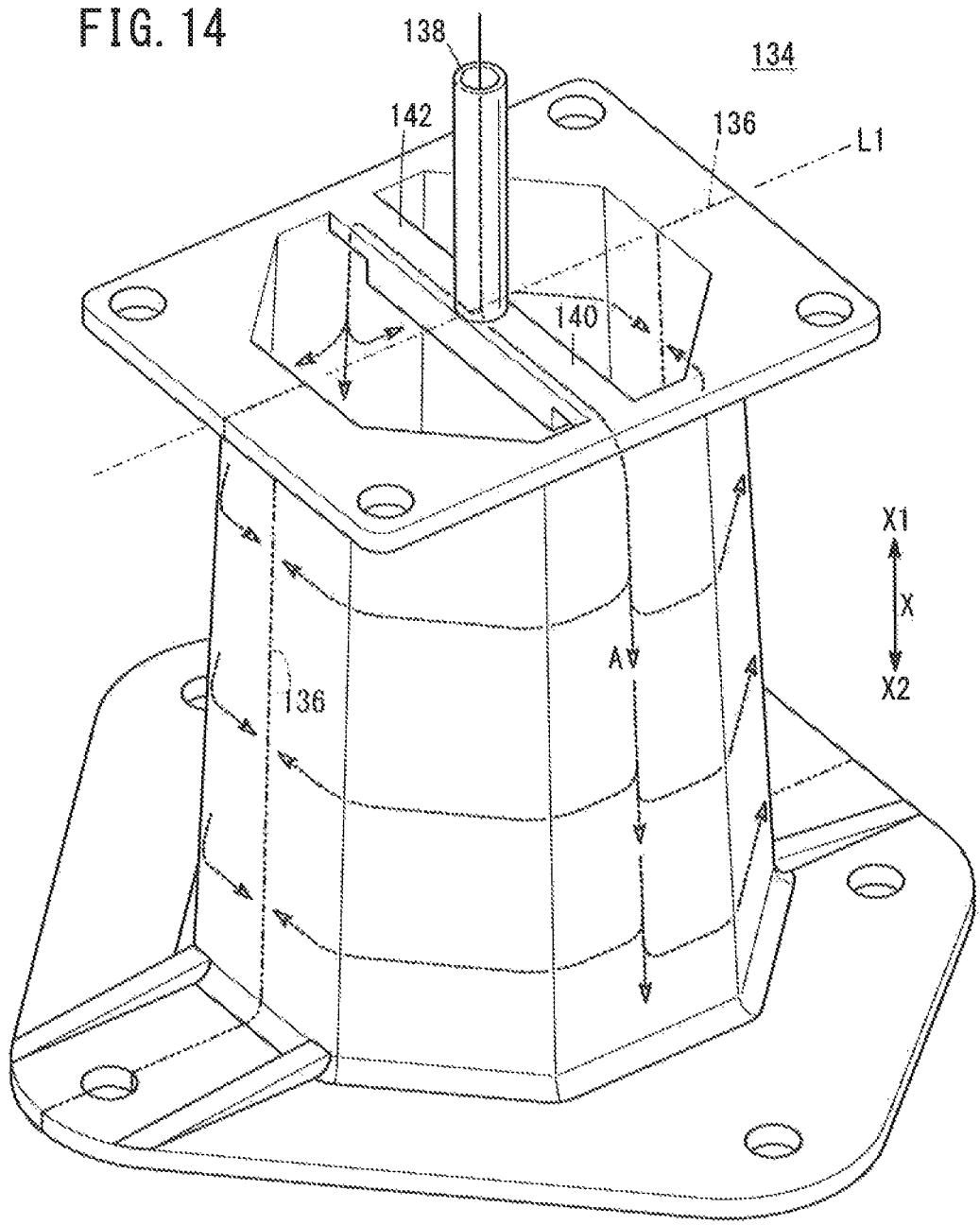
FIG. 14 is a schematic perspective view of a mold cavity for use in injection-molding an energy absorber shown in FIG. 12.

A process of manufacturing the energy absorber 114 with the weld lines 132 positioned in such a layout may include an injection molding process, for example, which employs a mold assembly (not shown) capable of forming a mold cavity 134 shown in FIG. 14, for example. On the mold cavity 134 shown in FIG. 14, the two-dot-and-dash lines indicate regions where the weld lines 132 are expected to be formed when the energy absorber 114 is molded, and such regions will be hereinafter referred to as projected weld line forming regions 136. That is, on the projected weld line forming regions 136, the weld lines 132 will be formed when the energy absorber 114 is molded. FIG. 14 illustrates the projected weld line forming regions 136 for obtaining the weld lines 132 whose tilt angle $\theta$ is 0°.

As shown in FIG. 14, the mold cavity 134 is of such a shape as to be able to obtain the energy absorber 114 by an integral injection molding. A sprue 138 for supplying molten resin to the mold cavity 134 is held in fluid communication with the mold cavity 134, and extends substantially parallel to the projected weld line forming regions 136. The sprue 138 has its lower end bifurcated into a set of runners 140, 142 extending straight in opposite directions away from the sprue 138.

The runners 140, 142 are held in fluid communication with the mold cavity 134 in opposite relation to each other in a plane perpendicular to a plane passing through both the projected weld line forming regions 136. As described later, the direction of the layout line L1 on the energy absorber 114 can be adjusted by adjusting the directions along which the runners 140, 142 extend. Specifically, on the energy absorber 114 that is produced by this injection molding, the layout line L1 extends perpendicularly to the directions along which the runners 140, 142 extend.

Molten resin that is supplied from the sprue 138 flows through the runners 140, 142 into the mold cavity 134, progressively filling the mold cavity 134. In the mold cavity 134, the molten resin flows around along different directions as indicated by the arrow A. As a result, flows of the molten resin flowing in from the runner 140 and flows of the molten resin flowing in from the runner 142 join each other at the projected weld line forming regions 136, which are located at intermediate positions between those molten resin flows. The joined molten resin flows are fused together, thereby forming weld lines 132 in the projected weld line forming regions 136.

In other words, the above injection-molding process makes it possible to form the weld lines 132 that extend along the longitudinal directions X and are disposed such that the tilt angle $\theta$ of the layout line L1 is 30° or less.

After the molten resin in the mold cavity 134 has solidified, the mold assembly is opened, and then the molded energy absorber 114 is obtained. The process of manufacturing the energy absorber 114 is not limited to the above molding process, but may be any of various processes insofar as they can form the weld lines 132 in the above layout.

Figure 15:
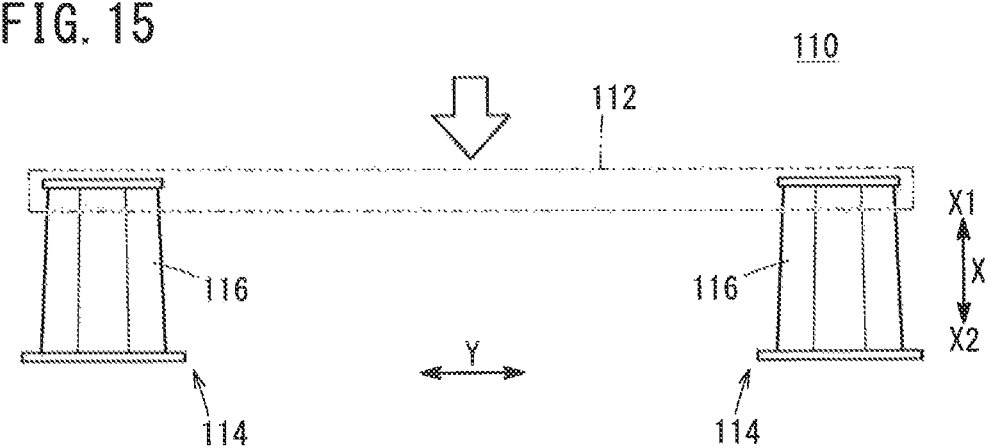
FIG. 15 is a schematic front elevational view illustrating the manner in which load is applied to the bumper structural body shown in FIG. 12.
Figure 16:
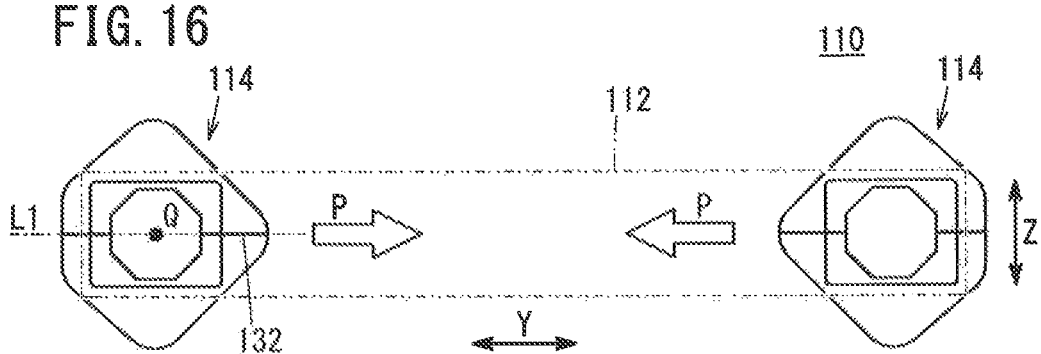
FIG. 16 is a schematic plan view illustrating the manner in which tensile load is applied to the energy absorbers of the bumper structural body shown in FIG. 12.

The manner in which the bumper structural body 110 behaves when a load is applied thereto along the longitudinal directions X will be described below with reference to FIGS. 15 and 16. FIG. 15 is a schematic front elevational view illustrating the manner in which a load is applied to the bumper structural body 110, and FIG. 16 is a schematic plan view illustrating the manner in which a tensile load is applied to each of the energy absorbers 114 of the bumper structural body 110. In FIG. 16, the tilt angle θ is illustrated as 0°.

Figure 17:
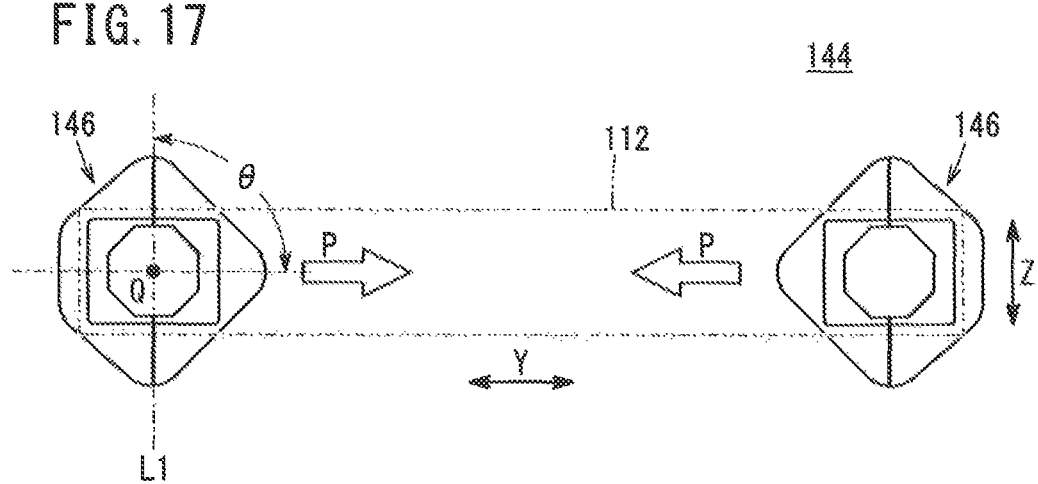
FIG. 17 is a schematic plan view illustrating the manner in which tensile load is applied to energy absorbers of a bumper structural body according to a comparative example.

FIG. 17 is a schematic plan view illustrating the manner in which a tensile load is applied to each of energy absorbers 146, wherein the tilt angle θ is 90°, of a bumper structural body 144 according to a comparative example. In FIGS. 15 through 17, the bumper beam 112 is shown by the two-dot-and-dash lines for convenience of explanation.

When a load is applied to the bumper structural body 110 along the longitudinal directions X as indicated by the arrow in FIG. 15, the bumper beam 112 absorbs the applied energy while being deformed. Therefore, as shown in FIG. 16, tensile loads P1 are applied along the directions in which the bumper beam 112 extends, to the energy absorbers 114, which support the bumper beam 112.

The tensile load P1 acts on the front end of each of the energy absorbers 114 attached to the bumper beam 112. Since the rear end sides of the energy absorbers 114 are fixed to the frame or the like of the vehicle body, a bending stress acts on the main body 116 so as to make the main body 116 expand outwardly in the transverse directions.

Figure 18:
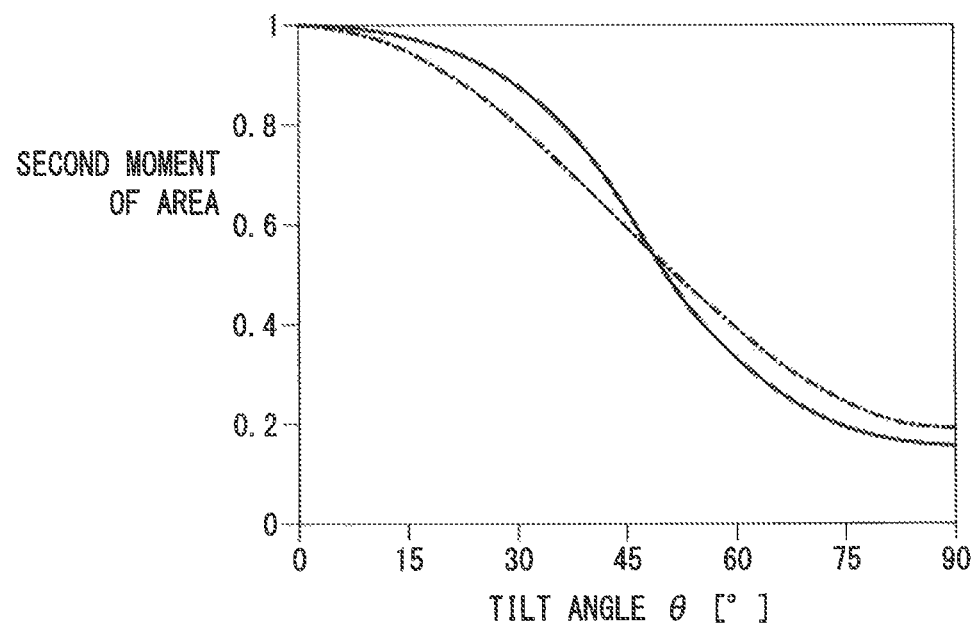
FIG. 18 is an analysis diagram showing the relationship between tilt angle and second moment of area in each of a bumper structural body having a main body of a quadrangular prismatic shape and a bumper structural body having a main body of a hollow cylindrical shape.

FIG. 18 is an analysis diagram showing the relationship between tilt angle θ and second moment of area of the bumper structural body 110. FIG. 18 shows a solid-line curve representative of a main body 116 having a quadrangular prismatic shape and a dot-and-dash-line curve representative of a main body 116 having a hollow cylindrical shape. The vertical axis of FIG. 18 represents the ratio of second moment of area to that of an energy absorber 114 that is free of weld lines 132. FIG. 18 shows an analysis on the assumption that the main body 116 is fractured along the weld lines 132.

As can be seen from FIG. 18, regardless of the shape of the main body 116, it is possible to prevent a reduction in the second moment of area of the energy absorber 114 with respect to the bending stress more effectively as the tilt angle θ approaches 0°. Stated otherwise, the closer the tilt angle θ is to 0°, the closer the rigidity of the energy absorber 114 is to the rigidity of the energy absorber 114 that is free of weld lines 132.

It can also be understood that if the tilt angle θ increases up to 90°, then the magnitude of the second moment of area becomes about ⅕ of the magnitude of the second moment of area at the tilt angle θ of 0°.

Figure 19:
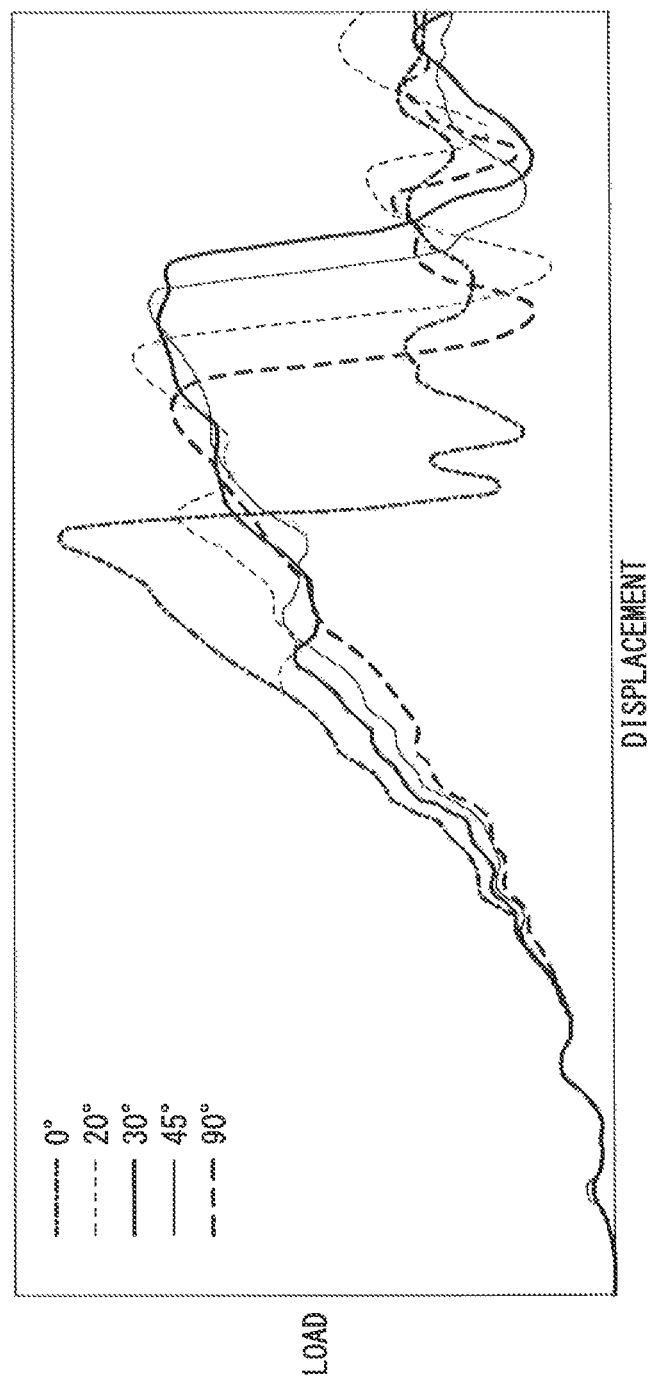
FIG. 19 is a displacement-load diagram showing an analysis made at each of tilt angles of a bumper structural body.
Figure 20:
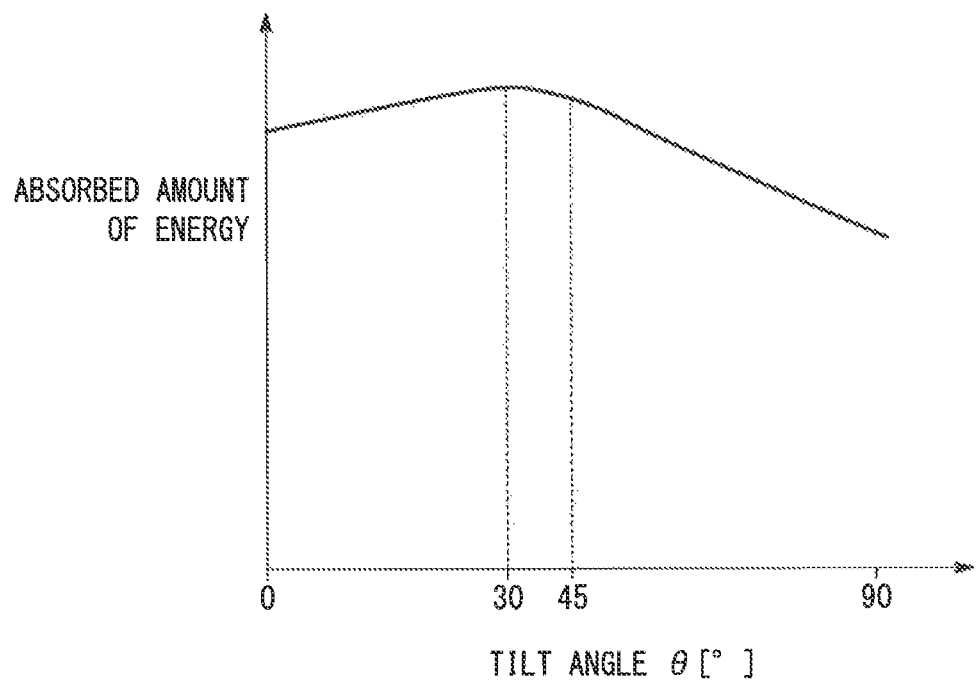
FIG. 20 is a graph showing the relationship between tilt angle and absorbed amount of energy.

FIG. 19 is a displacement-load diagram showing an analysis of the bumper structural bodies wherein the tilt angle θ is 0°, 20°, 30°, 45°, and 90°, respectively. Amounts of energy absorbed by the bumper structural bodies are determined from the respective areas between the displacement-load curves and the displacement axis in the displacement-load diagram shown in FIG. 19. FIG. 20 is a graph showing the relationship between the tilt angle θ and the absorbed amount of energy.

The displacement-load diagram can be determined from the displacement of an impactor at the time the impactor applies a load to a bumper structural body and a reaction force generated between the impactor and the bumper structural body. Therefore, the amount of energy absorbed by the bumper structural body can be determined on the basis of the magnitudes of the displacement amount and the reaction force.

It can be understood from FIG. 19 that the closer the tilt angle θ is to 0°, the greater the reaction force becomes, and that the closer the tilt angle θ is to 30°, the greater the displacement amount becomes.

Furthermore, it can be seen from FIG. 20 that if the tilt angle θ is equal to or less than 30°, the absorbed amount of energy determined on the basis of the magnitudes of the displacement amount and the reaction force is sufficiently large. It can also be seen that if the tilt angle θ increases in excess of 30°, then the absorbed amount of energy starts to drop, and if the tilt angle θ reaches 90°, the absorbed amount of energy becomes much smaller than if the tilt angle θ is 0°.

In the bumper structural body 110 according to the present embodiment, the tilt angle θ of the layout line L1 with respect to the directions along which the bumper beam 112 extends, i.e., the directions along which the tensile load P1 is applied, is set to be equal to or less than 30°. The tilt angle θ thus set makes it possible to greatly increase the second moment of area (rigidity) compared with the bumper structural body 144 in which the tilt angle θ is 90° as shown in FIG. 17, for example. If the tilt angle θ of the bumper structural body 110 according to the present embodiment is 0° as shown in FIG. 16, then the energy absorbers 114 thereof can have substantially the same rigidity as with the energy absorber 114 that is free of weld lines 132.

The bumper structural body 110 according to the present embodiment can achieve a sufficient absorbed amount of energy determined on the basis of the magnitudes of the displacement amount and the reaction force by setting the tilt angle θ to be equal to or less than 30°. In other words, if it is necessary to obtain a bumper structural body 110 that has excellent rigidity and reaction force as described above, then the tilt angle θ may be set so as to be closer to 0°. If it is necessary to obtain a bumper structural body 110 that can absorb a large amount of energy, then the tilt angle θ may be set so as to be closer to 30°.

In the bumper structural body 110, the weld lines 132 extend along the longitudinal directions X as described above. Therefore, when a load is applied to the bumper structural body 110 along the longitudinal directions X as shown in FIG. 15, the load is imposed along the directions in which the weld lines 132 extend. Therefore, when the load is applied to the energy absorbers 114, the weld lines 132 which are lower in mechanical strength than the other regions are prevented from being disposed on a plane where a principal shear stress acts (principal shear stress plane). The principal shear stress plane is a plane that is inclined at an angle of 45° with respect to the longitudinal directions X along which the load is applied.

From the foregoing, the bumper structural body 110 can be produced in lighter weight and with increased productivity since the energy absorbers 114 can be formed by injection-molding of a fiber-reinforced thermoplastic. Since an excessive load is prevented from being applied to the weld lines 132 even though the energy absorbers 114 are formed by injection-molding, the energy absorbers 114 can be prevented from cracking or being damaged at the weld lines 132. Consequently, the energy absorbers 114 can efficiently absorb the applied energy while sufficiently supporting the bumper beam 112 which is being deformed under the load.

The bumper structural body according to the present invention is not limited to the above embodiment, but various changes and modifications may be made therein without departing from the scope of the present invention.

For example, the energy absorber 114 according to the embodiment described above has a set of (two) weld lines 132 at positions which face each other across the openings 118, 122 in the vehicle transverse direction Y. However, the number of the weld lines 132 is not limited thereto, but may be one.

The set of weld lines 132 may not be disposed in face-to-face relation to each other as described above. In this case, the tilt angle θ, which is an angle formed between the vehicle transverse direction Y and the layout line L1 passing through the intersection Q1 and an end 132a of each of the weld lines 132, may be set so as to be equal to or less than 30°. The tilt angle θ thus set offers the same advantages as with the above embodiment.

Inventive Example

Using a testing machine provided with a pendulum indenter, a fracture test was conducted at a rate of 20 mm/min. on the bumper structural body 110 shown in FIG. 16 and the bumper structural body 144 shown in FIG. 17. A displacement-load diagram obtained as the result of the test is illustrated in FIG. 21.

It can be seen from FIG. 21 that both the reaction force and the displacement amount in the bumper structural body 110 according to the present embodiment are greater than those in the bumper structural body 144 according to the comparative example. Stated otherwise, the bumper structural body 110 having the tilt angle θ of 0° is capable of efficiently absorbing the applied energy compared to the bumper structural body 144 having the tilt angle θ of 90°.

What is claimed is:

1. An energy absorber including a main body of a closed cross-sectional structure formed by injection-molding a fiber-reinforced thermoplastic, the energy absorber having a weld line formed thereon, wherein:
the main body has openings defined in opposite ends thereof, each of the openings being of a polygonal shape; and
the weld line is formed on a side surface of the main body, and a tilt angle of the weld line is set to a value in a range from −35° to 35° with respect to a reference line interconnecting midpoints on opposite sides of the side surface that are located at the opposite ends of the main body.

2. The energy absorber according to claim 1, wherein the main body includes at least a portion having a horizontal cross section, the horizontal cross section having a first side and a second side adjacent to the first side, the first side has a thickness t and a length b, the thickness t and the length b having a relationship of t/b≥0.045, and the first side and the second side form therebetween an angle equal to or smaller than 150°.

3. The energy absorber according to claim 1, wherein the tilt angle is 0°.

4. The energy absorber according to claim 1, wherein either one of the opposite ends of the main body is attached to a bumper beam.

5. An energy absorber including a main body of a closed cross-sectional structure formed by injection-molding a fiber-reinforced thermoplastic, the energy absorber having a weld line formed thereon, wherein:
the main body has openings defined in opposite ends thereof, each of the openings being of a circular shape; and
a tilt angle of the weld line is set to a value in a range from −35° to 35° with respect to a reference line extending along an axial direction of the main body.

6. The energy absorber according to claim 5, wherein the tilt angle is 0°.

7. The energy absorber according to claim 5, wherein either one of the opposite ends of the main body is attached to a bumper beam.

8. A bumper structural body including a bumper beam extending along a transverse direction of a vehicle body and an energy absorber having a main body of a closed cross-sectional structure formed by injection-molding a fiber-reinforced thermoplastic, the energy absorber having a weld line formed thereon, the energy absorber being mounted on the bumper beam, the main body extending along a longitudinal direction of the vehicle body, wherein:
the weld line has an end and another end disposed respectively on a front end and a rear end of the energy absorber in the longitudinal direction; and
a tilt angle of a layout line with respect to a first imaginary line is equal to or less than 30°, wherein:
the first imaginary line is defined as an imaginary line that passes through a first midpoint which is a midpoint between upper and lower ends, in a vertical direction of the vehicle body, of an opening defined in a front end of the main body which faces the bumper beam, and extends along a direction in which the bumper beam extends:
the layout line is defined as an imaginary line that passes through an intersection between the first imaginary line and a second imaginary line, and through the end of the weld line; and
the second imaginary line is defined as an imaginary line that passes through a second midpoint which is a midpoint between an end and another end of the opening in the direction in which the bumper beam extends, and extends along the vertical direction of the vehicle body.

9. The bumper structural body according to claim 8, wherein the layout line extends along the direction in which the bumper beam extends.

10. The bumper structural body according to claim 8, wherein the weld line extends along the longitudinal direction of the vehicle body.

* * * * *